United States Patent
Sawabe et al.

(10) Patent No.: US 6,577,589 B1
(45) Date of Patent: Jun. 10, 2003

(54) INFORMATION RECORDING MEDIUM, INFORMATION RECORDING APPARATUS AND INFORMATION REPRODUCING APPARATUS

(75) Inventors: Takao Sawabe, Tokyo-to (JP); Kaoru Yamamoto, Tsurugashima (JP); Akihiro Tozaki, Tsurugashima (JP)

(73) Assignee: Pioneer Corporation, Tokyo-to (JP)

( * ) Notice: Subject to any disclaimer, the term of this patent is extended or adjusted under 35 U.S.C. 154(b) by 0 days.

(21) Appl. No.: 09/447,416

(22) Filed: Nov. 23, 1999

(30) Foreign Application Priority Data

Nov. 25, 1998 (JP) .......................................... 10-334828

(51) Int. Cl.⁷ ................................................ G11B 7/00
(52) U.S. Cl. ............................... 369/275.3; 369/59.25; 369/47.1
(58) Field of Search ............................ 369/47.1, 47.15, 369/47.14, 47.16, 53.1, 53.2, 53.31, 59.1, 59.25, 275.1, 275.3

(56) References Cited

U.S. PATENT DOCUMENTS 5,886,965 A  *  3/1999  Tozaki et al. ............. 369/47.23
6,263,152 B1 *  7/2001  Hisatomi et al. ........... 386/111

FOREIGN PATENT DOCUMENTS

| EP | 0 677 961 | 10/1995 |
| EP | 0 689 206 | 12/1995 |
| EP | 0 724 264 | 7/1996 |
| EP | 0 737 980 | 10/1996 |
| EP | 0 738 078 | 10/1996 |
| EP | 0 788 094 | 8/1997 |

* cited by examiner

*Primary Examiner*—Muhammad Edun
(74) *Attorney, Agent, or Firm*—Morgan, Lewis & Bockius LLP

(57) ABSTRACT

On an information recording medium such as a DVD, record information comprising information units, each including partial audio information obtained by dividing compressed audio information obtained by applying a variable length compression onto raw audio information, is recorded. The information unit includes header information and lead data which is the compressed audio information positioned at a lead of one or a plurality of the partial audio information. The header information includes: reproduction time control information such as a PTS indicative of a time of reproducing the partial audio information, to which first lead data among the lead data included in the information unit together with the header information belongs; forward position information such as a forward search pointer indicative of a position on the information recording medium, at which the compressed audio information to be reproduced a first predetermined time duration after a reproduction time indicated by the reproduction time control information on a reproduction time axis of the compressed audio information is recorded; and backward position information such as a backward search pointer indicative of a position on the information recording medium, at which the compressed audio information to be reproduced a second predetermined time duration before the reproduction time on the reproduction time axis is recorded.

33 Claims, 14 Drawing Sheets

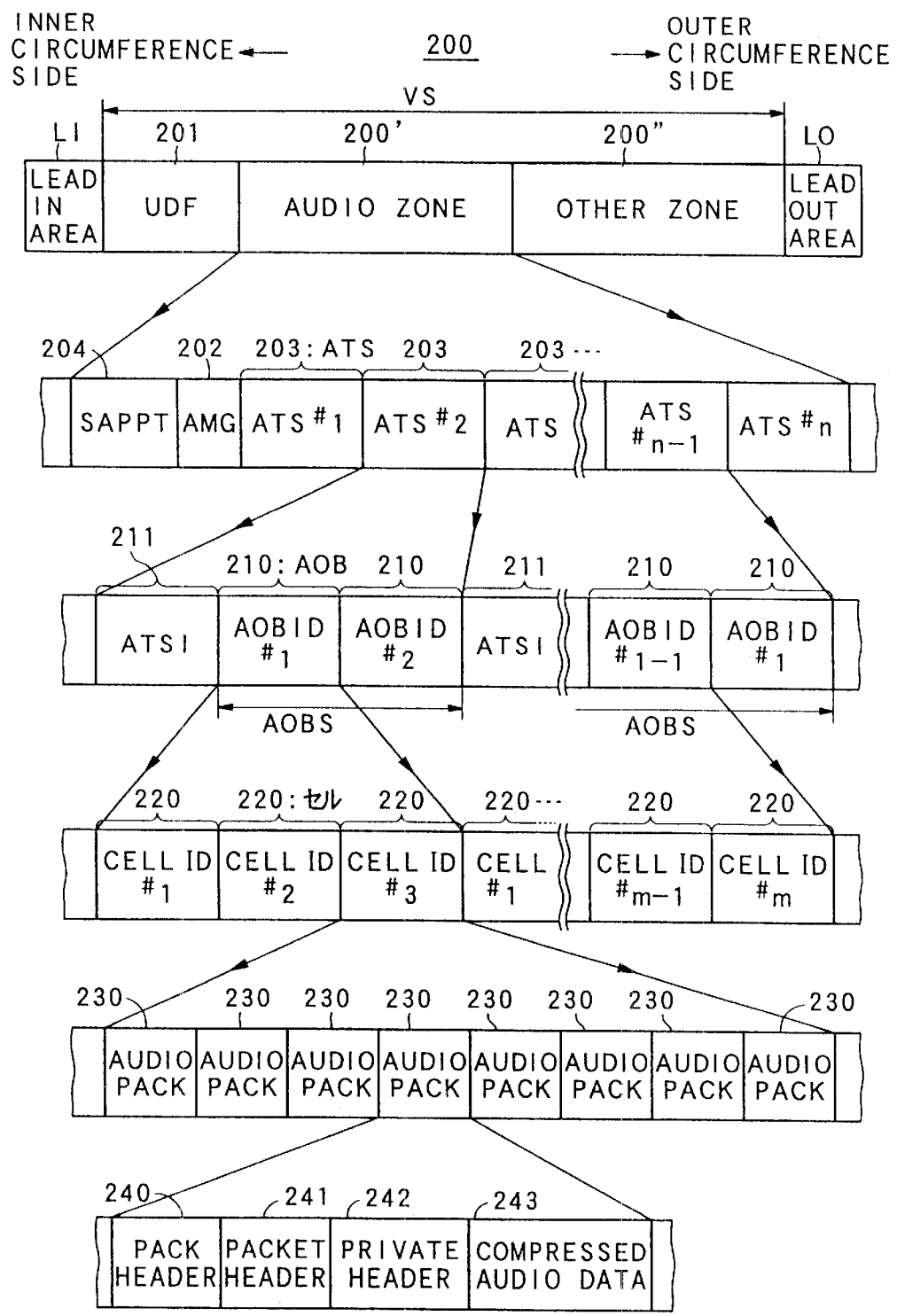

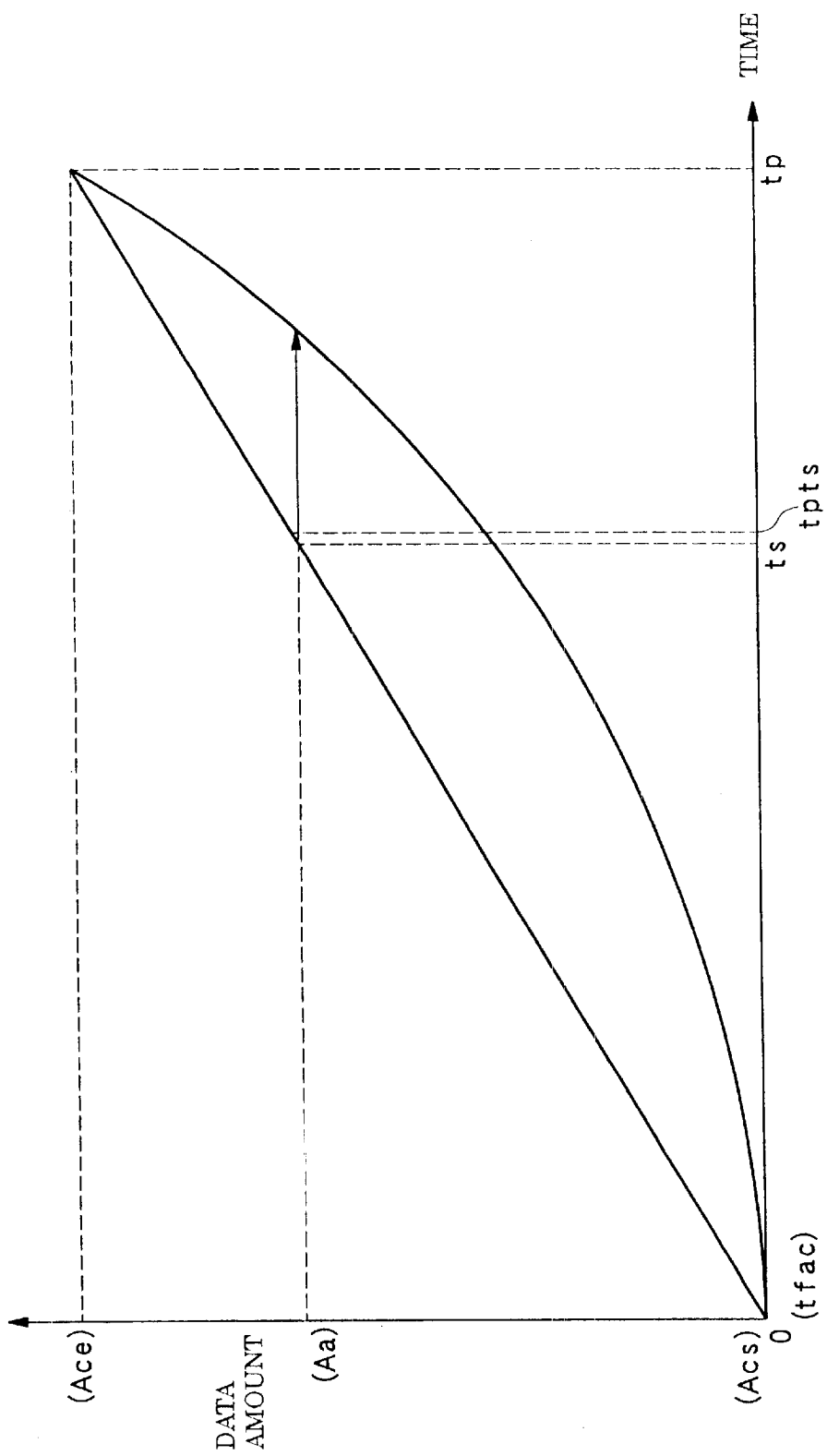

INFORMATION RECORDING MEDIUM, INFORMATION RECORDING APPARATUS AND INFORMATION REPRODUCING APPARATUS

BACKGROUND OF THE INVENTION

1. Field of the Invention

The present invention relates to an information recording medium, such as an optical disc or the like, an information recording apparatus for recording record information onto the information recording medium, and an information reproducing apparatus for reproducing the record information recorded on the information recording medium. More particularly, it relates to an information recording medium on which reproduction control information to control a reproduction of the recorded record information is recorded together with the record information, an information recording apparatus for recording the reproduction control information together with the record information onto the information recording medium, and an information reproducing apparatus for reproducing the record information recorded on the information recording medium.

2. Description of the Related Art

In recent years, a technique-has been developed, which increases a recording capacity on an information recording medium such as an optical disc or the like and records one entire movie on one sheet of optical disc for example. As a result, a so-called DVD having a recording capacity equal to about seven times as that of a-conventional CD (Compact Disc) is put into a practical use.

Then, as this DVD, in addition to a so-called DVD video to record the above-mentioned movie, a so-called DVD audio to record only voice information and tone information other than voice information such as accompaniment information and the like is also put into a practical use (hereafter, the voice information and the tone information are collectively referred to as "audio information").

Here, in a case of the DVD audio, audio information to be recorded on the DVD audio (which is a disc recorded by a DVD audio format) may be non-compressed audio information such as a so-called PCM (Pulse Code Modulation) and the like, for example. This case has a problem that, if a quantization bit number and a sampling frequency are increased, the audio information may become vast so that a music composition of a long time cannot be recorded on one sheet of DVD audio.

So, a method of recording the audio information onto the DVD audio after compressing non-compressed raw or original audio information may be tried.

As a method of compressing the raw audio information, there are one method of setting the compressed audio information, which is generated as a result of the compression, to be a fixing rate, and another method of setting the compressed audio information to be a variable rate. It is thought that the latter so-called variable length compression method can further improve the recording density in consideration that a characteristic of the raw audio information to be compressed (actually, for example, an information amount within a unit time) is changed from time to time in one raw audio information.

However, for example, if performing a fast forward reproduction or a fast backward reproduction on the DVD audio on which the compressed audio information, which is variable-length-compressed, is recorded as a variation in the reproduction control (which is actually an intermittently fast forward reproduction or fast backward reproduction for repeating the operation of performing a forward jump or a backward jump onto the compressed audio information to be reproduced several sec. (seconds) before or after the compressed audio information which is currently being reproduced, and then reproducing the compressed audio information several sec. before or after for a short time duration (for example, 0.2 sec.), and hereafter, both of the intermittently fast forward reproduction and the intermittently fast backward reproduction are collectively referred to as an "intermittent reproduction"), it is difficult to perform the conventional operation of searching the information several sec. before or after since the recorded compressed audio information itself is compressed in the variable length.

That is, if the compression method is carried out at the fixed rate, it is possible to multiply an information amount per the unit time by a time duration to be jumped, to thereby search a position to be jumped. However, if the compression method is carried out at the variable rate, since the information amount per the unit time is variable, a search for the position to be jumped becomes extremely complex. This results in a problem that the fast forward reproduction or the fast backward reproduction or the like cannot be practically carried out, which reduces the variation at the time of reproducing the compressed audio information and extremely drops the flexibility or versatility in the reproduction.

SUMMARY OF THE INVENTION

The present invention is proposed in diagram of the above mentioned problems. It is therefore an object of the present invention to provide an information recording medium which can variable-length-compress the raw audio information so as to record a music composition of a long time and also increase a variation in the reproduction manner of the compressed audio information to thereby improve the flexibility in the reproduction, an information recording apparatus for recording the compressed audio information onto the information recording medium, and an information reproducing apparatus for reproducing the compressed audio information recorded on the information recording medium.

The above object of the present invention can be achieved by an information recording medium such as a DVD or the like on which record information comprising information units, each including partial audio information obtained by dividing compressed audio information obtained by applying a variable length compression onto raw audio information, is recorded, wherein (i) the information unit includes header information and lead data which is the compressed audio information positioned at a lead of one or a plurality of the partial audio information, and (ii) the header information includes: reproduction time control information such as a PTS (Presentation Time Stamp) or the like indicative of a time of reproducing the partial audio information, to which first lead data among the lead data included in the information unit together with the header information belongs; forward position information such as a forward search pointer or the like indicative of a position on the information recording medium, at which the compressed audio information to be reproduced a first predetermined time duration after a reproduction time indicated by the reproduction time control information on a reproduction time axis of the compressed audio information is recorded; and backward position information such as a backward search pointer or the like indicative of a position on the information recording medium, at which the compressed audio information to be reproduced a second predetermined time duration before the reproduction time on the reproduction time axis is recorded.

According to the information recording medium of the present invention, even if the information amounts of the compressed audio information included in the respective information units are different from each other due to the variable-length-compression, it is possible to speedily search the compressed audio information at a desirable position by controlling the reproduction by use of the forward position information or the backward position information at the time of reproduction.

Therefore, even in case of variable-length-compressing the raw audio information, recording it and reproducing it in order to increase the information amount recordable on the information recording medium, it is possible to perform a fast forward reproduction or a fast backward reproduction for example, or perform a reproduction of the compressed audio information with designating in advance the compressed audio information to be reproduced, by speedily searching the partial audio information corresponding to the forward position information or the partial audio information corresponding to the backward position information. Hence, it is possible to improve the flexibility in reproducing the compressed audio information.

By these, it is possible to improve the recording capacity of the raw audio information by variable-length-compressing the raw audio information and recording it while keeping the improved flexibility at the time of reproduction as a result.

In one aspect of the information recording medium of the present invention, the forward position information is relative position information indicative of a position on the information recording medium of the information unit, in which the lead data to be reproduced the first predetermined time duration after is recorded, with respect to a position on the information recording medium of the information unit, in which the forward position information is recorded, and the backward position information is relative position information indicative of a position on the information recording medium of the information unit, in which the lead data to be reproduced the second predetermined time duration before is recorded, with respect to a position on the information recording medium of the information unit, in which the backward position information is recorded.

According to this aspect, since the forward position information and the backward position information are recorded respectively as the relative position information, it is possible to respectively express the forward position information and the backward position information with an almost minimum information amount.

Therefore, it is possible to increase the recording capacity of the compressed audio information to be primarily recorded, and a music composition search or the like can be speedily performed.

In another aspect of the information recording medium of the present invention, each of the first predetermined time duration and the second predetermined time duration is 1 sec. (second).

According to this aspect, it is possible to perform various reproduction controls such as a fast forward reproduction etc., by searching the compressed audio information efficiently without deteriorating the natural auditory sense at the time of reproduction-controlling the compressed audio information.

In another aspect of the information recording medium of the present invention, the record information has a physically hierarchical structure with the information unit as a bottom layer.

According to this aspect, it is possible to search the partial audio information corresponding to the forward position information and the partial audio information corresponding to the backward position information even more efficiently.

In this aspect, management information, which is reproduction control information with regard to whole of the compressed audio information, may be recorded at a lead of the record information corresponding to a top layer of the hierarchical structure.

By constructing in this manner, it is possible to speedily search the compressed audio information by effectively using the management information as well as the forward position information and the backward position information.

Further in this case, the compressed audio information may include one or a plurality of music composition information, and the management information may include: music composition address information to search the compressed audio information with the music composition information as a unit; and music composition reproduction time duration.information indicative of a reproduction time duration in case of reproducing the compressed audio information with the music composition information as a unit.

By constructing in this manner, by using the management information as well as the forward position information and the backward position information, it is possible to perform the search for each of the music compositions, and perform the partial search, the partial fast forward reproduction or the partial fast backward reproduction within one music composition.

The above object of the present invention can be also achieved by an information recording apparatus for recording record information onto an information recording medium such as a DVD audio or the like, the record information comprising information units, each being obtained by dividing compressed audio information obtained by applying a variable length compression onto raw audio information and each including the compressed audio information and header information. The information recording apparatus is provided with: a reproduction control information generation device such as a signal process unit or the like for generating reproduction control information used for reproducing the compressed audio information included in the information unit together with the header information; a forward position information generation device such a signal process unit or the like for generating forward position information indicative of a position on the information recording medium, at which the compressed audio information to be reproduced a first predetermined time duration after on a reproduction time axis of the compressed audio information is recorded; a backward position information generation device such as a signal process unit or the like for generating backward position information indicative of a position on the information recording medium, at which the compressed audio information to be reproduced a second predetermined time duration before on the reproduction time axis; and a recording device such as a mastering device or the like for recording the generated reproduction control information, the generated forward position information and the generated backward position information as the header information onto the information recording medium.

According to the information recording apparatus of the present invention, since the forward position information and the backward position information are respectively recorded in the header information recorded within the information unit together with the compressed audio information, even if the information amounts of the compressed audio information included in the respective information units are different from each other due to the variable-length-compression, it is possible to speedily search the compressed audio information at a desirable position by controlling the reproduction by use of the forward position information or the backward position information at the time of reproduction.

Therefore, even in case of variable-length-compressing the raw audio information, recording it and reproducing it in order to increase the information amount recordable on the information recording medium, it is possible to perform a fast forward reproduction or a fast backward reproduction for example, or perform a reproduction of the compressed audio information with designating in advance the compressed audio information to be reproduced, by speedily searching the partial audio information corresponding to the forward position information or the partial audio information corresponding to the backward position information. Hence, it is possible to improve the flexibility in reproducing the compressed audio information.

By these, it is possible to improve the recording capacity of the raw audio information by variable-length-compressing the raw audio information and recording it while keeping the improved flexibility at the time of reproduction as a result.

In one aspect of the information recording apparatus of the present invention, each of the first predetermined time duration and the second predetermined time duration is 1 sec. (second).

According to this aspect, it is possible to perform various reproduction controls such as a fast forward reproduction etc., by searching the compressed audio information efficiently without deteriorating the natural auditory sense at the time of reproduction-controlling the compressed audio information.

The above object of the present invention can be also achieved by a first information reproducing apparatus for reproducing compressed audio information from the above described information recording medium of the present invention. The first information reproducing apparatus is provided with: a detecting device such as an optical pickup or the like for detecting one forward position information; a reproducing device such as an audio decoder or the like for reproducing at least one portion of the compressed audio information, which is recorded on the information recording medium at a position indicated by the detected one forward position information; a controlling device such as a system controller or the like for controlling, the detecting device and the reproducing device to repeat (i) detecting another forward position information recorded within the information unit, in which the reproduced compressed audio information is included, as new forward position information and (ii) reproducing at least one portion of the compressed audio information recorded on the information recording medium at a position indicated by the new forward position information.

According to the first information reproducing apparatus of the present invention, since the operations of detecting the forward position information, reproducing at least one portion of the compressed audio information recorded on the information recording medium at the position indicated by the detected forward position information and further detecting the forward position information recorded together with the reproduced compressed audio information, it is possible to speedily perform the fast forward reproduction of the compressed audio information which is variable-length-compressed.

Therefore, even in case of variable-length-compressing the raw audio information, recording it and reproducing it in order to increase the information amount recordable on the information recording medium, it is possible to perform a fast forward reproduction by speedily searching the partial audio information corresponding to the forward position information. Hence, it is possible to improve the flexibility in reproducing the compressed audio information.

By these, it is possible to improve the recording capacity of the raw audio information by variable-length-compressing the raw audio information and recording it while keeping the improved flexibility at the time of reproduction as a result.

The above object of the present invention can be also achieved by a second information reproducing apparatus for reproducing compressed audio information from the above described information recording medium of the present invention. The second information reproducing apparatus is provided with: a detecting device such as an optical pickup or the like for detecting one backward position information; a reproducing device such as an audio decoder or the like for reproducing at least one portion of the compressed audio information, which is recorded on the information recording medium at a position indicated by the detected backward position information; a controlling device such as a system controller or the like for controlling the detecting device and the reproducing device to repeat (i) detecting another backward position information recorded within the information unit, in which the reproduced compressed audio information is included, as new backward position information and (ii) reproducing at least one portion of the compressed audio information recorded on the information recording medium at a position indicated by the new backward position information.

According to the second information reproducing apparatus of the present invention, since the operations of detecting the backward position information, reproducing at least one portion of the compressed audio information recorded on the information recording medium at the position indicated by the detected backward position information and further detecting the backward position information recorded together with the reproduced compressed audio information, it is possible to speedily perform the fast backward reproduction of the compressed audio information which is variable-length-compressed.

Therefore, even in case of variable-length-compressing the raw audio information, recording it and reproducing it in order to increase the information amount recordable on the information recording medium, it is possible to perform a fast backward reproduction by speedily searching the partial audio information corresponding to the backward position information. Hence, it is possible to improve the flexibility in reproducing the compressed audio information.

By these, it is possible to improve the recording capacity of the raw audio information by variable-length-compressing the raw audio information and recording it while keeping the improved flexibility at the time of reproduction as a result.

The above object of the present invention can be also achieved by a third information reproducing apparatus for reproducing compressed audio information from one of the aspects of the above described information recording medium of the present invention, wherein the record information has a physically hierarchical structure with the information unit as a bottom layer, wherein management information, which is reproduction control information with regard to whole of the compressed audio information, is recorded at a lead of the record information corresponding to a top layer of the hierarchical structure, and wherein the compressed audio information includes one or a plurality of music composition information, and the management information includes: music composition address information to search the compressed audio information with the music composition information as a unit; and music composition reproduction time duration information indicative of a reproduction time duration in case of reproducing the compressed audio information with the music composition information as a unit. The third information reproducing apparatus is provided with: a first detecting device such as an optical pickup or the like for detecting the management information corresponding to the music composition information to be reproduced; a searching device such as a system controller or the like for searching a position on the information recording medium of the music composition information to be reproduced on the basis of the detected management information; a second detecting device such as an optical pickup or the like for detecting at least one of the forward position information and the backward position information within the information unit recorded at the searched position; and a reproducing device such as an audio decoder or the like for searching a reproduction start position within the music composition information to be reproduced by using at least one of the detected forward position information and the detected backward position information, and reproducing the compressed audio information recorded at the searched reproduction start position.

According to the third information reproducing apparatus of the present invention, it is possible to speedily reproduce the compressed audio information at the reproduction start position of the music composition information by utilizing the forward position information and the backward position information as well as the management information corresponding to the music composition information to be reproduced.

Therefore, even in case of variable-length-compressing the raw audio information, recording it and reproducing it in order to increase the information amount recordable on the information recording medium, it is possible to perform the reproduction of the compressed audio information to be reproduced which is designated in advance. Hence, it is possible to improve the flexibility in reproducing the compressed audio information.

By these, it is possible to improve the recording capacity of the raw audio information by variable-length-compressing the raw audio information and recording it while keeping the improved flexibility at the time of reproduction as a result.

The above object can be achieved by a fourth information reproducing apparatus for reproducing compressed audio information from one of the aspects of the above described information recording medium of the present invention, wherein the record information has a physically hierarchical structure with the information unit as a bottom layer, wherein management information, which is reproduction control information with regard to whole of the compressed audio information, is recorded at a lead of the record information corresponding to a top layer of the hierarchical structure, and wherein the compressed audio information includes one or a plurality of music composition information, and the management information includes: music composition address information to search the compressed audio information with the music composition information as a unit; and music composition reproduction time duration information indicative of a reproduction time duration in case of reproducing the compressed audio information with the music composition information as a unit. The fourth information reproducing apparatus is provided with a designating device such as an input device or the like for designating music composition information to be reproduced and an elapse time from a lead of the music composition information; a first detecting device such as an optical pickup or the like for detecting the management information corresponding to the designated music composition information; a searching device such as a system controller or the like for searching a position on the information recording medium of the designated music composition information on the basis of the detected management information; a second detecting device such as an optical pickup or the like for detecting at least one of the forward position information and the backward position information within the information unit recorded at the searched position; and a reproducing device such as an audio decoder or the like for searching a reproduction start position corresponding to the designated elapsed time from the lead of the designated music composition information by using at least one of the detected forward position information and the detected backward position information, and reproducing the compressed audio information recorded at the searched reproduction start position.

According to the fourth information reproducing apparatus of the present invention, it is possible to speedily reproduce the compressed audio information at the position corresponding to the elapsed time from the lead of the music composition information, by utilizing the forward position information and the backward position information as well as the management information corresponding to the designated music composition information.

The nature, utility, and further features of this invention will he more clearly apparent from the following detailed description with respect to preferred embodiments of the invention when read in conjunction with the accompanying drawings briefly described below.

BRIEF DESCRIPTION OF THE DRAWINGS

FIG. 1 is a diagram showing a physical format of a DVD audio of an embodiment;

FIG. 14 is a graph explaining a process in the time search reproduction in the embodiment.

DETAILED DESCRIPTION OF THE PREFERRED EMBODIMENTS

Figure 2A:
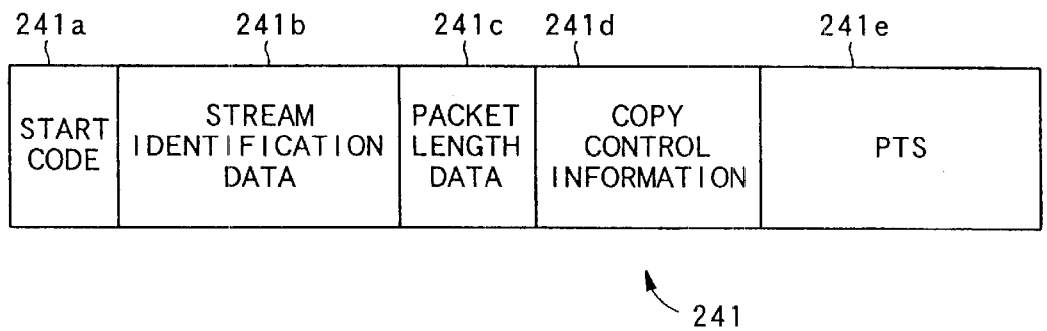
FIG. 2A is a diagram exemplifying a physical format of a packet header in the DVD audio of the embodiment.

Preferred embodiments of the present invention will be explained below with reference to the drawings. The following embodiments are the embodiments in which the present invention is applied to the above-mentioned DVD audio, a disc manufacturing apparatus for manufacturing the DVD audio as one kind of information recording apparatus for recording the compressed audio information, and an information reproducing apparatus for reproducing an audio information recorded on the DVD audio.

In the following embodiments, an example of each of components in claims shown on a left side of a following list is constituted by respective one of components shown on a right side of the following list.

Partial Audio Information . . . Access Unit (in Which Audio Frame Is Compressed)
Information Unit . . . Audio Pack
Header Information . . . Private Header
Reproduction Time Control Information . . . PTS within Packet Header
Forward Position Information . . . Forward Search Pointer
Backward Position Information . . . Backward Search Pointer
Management Information . . . AMG, SAPPT and ATSI
Music Composition Address Information . . . Audio Title Set Cell Playback Information Table in ATSI or Track Start Address in SAPPT
Music Composition Reproduction Time Information . . . Audio Title Set Program Playback Time in Audio Title Set Program Information Table or Track Reproduction Time in SAPPT

(I) Embodiment of Information Recording Medium

At first, a physical configuration and a logical configuration of the above-mentioned DVD audio that is the embodiment of the information recording medium according to the present invention are described with reference to FIGS. 1 to 3.

FIG. 1 and FIGS. 2A to 2C are diagrams showing a record format of the DVD audio. FIG. 3 is a diagram showing a logical format of the DVD audio.

At first, the record format (i.e., the physical record format) of audio information on the DVD audio is described with reference to FIG. 1 and FIGS. 2A to 2C.

As shown in FIG. 1, a DVD audio 200 serving as the information recording medium in the embodiment has a lead-in-area LI on an innermost circumference side and also has a lead-out-area LO on an outermost circumference side. A volume space VS is formed between them.

A UDF (Universal Disc Format) 201 including information to manage a file structure of the audio information recorded on the DVD audio 200, at least one audio zone 200' actually including the audio information and an other zone 200" including information other than the audio information are formed in this order from the side of the lead-in-area LI, within the volume space VS.

Next, the audio information included within the audio zone 200' is divided into a plurality of ATSs. (Audio Title Sets) 203 (ATS #1 to ATS #n) each having an ID (Identification Number). Moreover, an SAPPT (Simple Audio Play Pointer Table) 204 that is information required to reproduce the audio information (to which the variable length compression is applied in the actual DVD audio 200, as described later) through two channels (this SAPPT 204 is always recorded within all the DVD audios 200 having the audio zone 200') and an AMG (Audio Manger) 202 that is information required to reproduce a later-described title group recorded within the audio zone 200' are recorded from a lead of the audio zone 200', in portions other than the ATS 203 within the audio-zone 200'.

A start address and an end address indicating the record positions on the DVD audio 200 of all tracks (all music compositions), as described later, which can be reproduced through the two channels, a lead PTS (Presentation Time Stamp; which will be described later in detail) of each track, a track reproduction time and the like are recorded on this SAPPT.

The information with regard to the whole audio information recorded on the DVD audio 200 is recorded in the AMG 202, for example, such as a menu to prompt an audience to select an item, information to protect an illegal copy, an access table to reproduce each title and the like.

Next, one ATS 203 is provided with a plurality of AOBs (Audio Objects) 210 each having an ID number with an ATSI (Audio Title Set Information) 211 as a lead thereof.

Here, a portion constituted by the plurality of AOBs 210 is typically referred to as an ABO set (AOBS). This AOB set is intended to sort the substantial portion of the audio information from other control information.

Next, the information of ATSPGCI (Audio Title Set Program Chain Information) implying various information with regard to a program chain that is a logical division constituted by a combination of a plurality of cells (which will be described later) and the like are recorded in the ATSI 211 recorded at a lead of the ATS 203.

Each AOB 210 contains the substantial portion of the audio information. One AOB 210 is provided with a plurality of cells 220 each having an ID number.

Next, one cell 220 is composed of a plurality of audio packs 230, each of which is packed and implies a bottom layer of a hierarchical structure. Here, in the audio pack 230, the variable-length-compressed audio information to be recorded onto the DVD audio 200 is packed for each predetermined size.

The one cell 220 may contain: information regarding to a musical composer and a copyright; text information of a name of a music composition or words of a song and the like; access information to access a home page of Internet; real time information pack including a BPM (Beat Per Minutes) and a rhythm information etc.,; and so on, other than the above-mentioned audio pack 230, instead of one or more audio packs 230.

Next, one audio pack 230 contains from a lead thereof: a pack header 240; a packet header 241 including an identification, number to identify a packet of a private stream 1 (which is a stream type determined by an MPEG (Moving Picture Expert Group) method as an example of a compression method) having the audio information with in the audio pack 230 and the like; a private header 242 containing an identification number to identify an information unit actually including the compressed audio information and an address information indicative of a record position on the DVD audio 200 of a packet to be reproduced 1 sec. before or 1 sec. after according to the present invention and the like; and compressed audio data 243 which is the substantial portion of the audio information.

At this time, more concretely, as the information contained within the packet header 241, as shown in FIG. 2A, there are a start code 241a (three bytes), a stream identification data 241b (one byte), which is a flag to identify that the information recorded following the packet header 241 is a private stream 1, packet length data 241c (two bytes) indicative of a length of the packet itself, copy control information 241d (three bytes), and a PTS 241e (five bytes) indicative of a time corresponding to a reproduction time of an access unit to be firstly accessed (actually, in FIG. 2C, a first access unit $243_n$ recorded from a lead data T, among access units $243_{n-1}$, $243_n$ and $243_{n+1}$ recorded in the compressed audio information 243) among the access units (which is a minimum unit of the information which can be accessed after it is generated when the audio information to be recorded on the DVD audio 200 is compressed to then prepare the compressed audio information) recorded in the compressed audio-information 243 recorded following the packet header 241 and the private header 242.

Figure 2B:
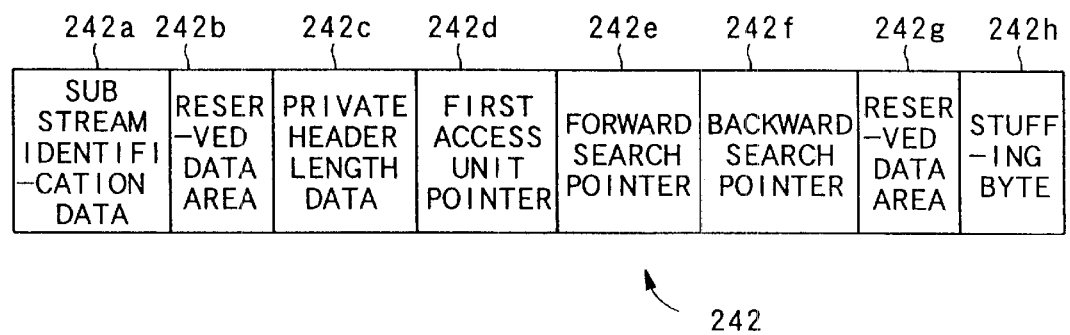
FIG. 2B is a diagram showing a physical format of a private header in the DVD audio of the embodiment.
Figure 2C:
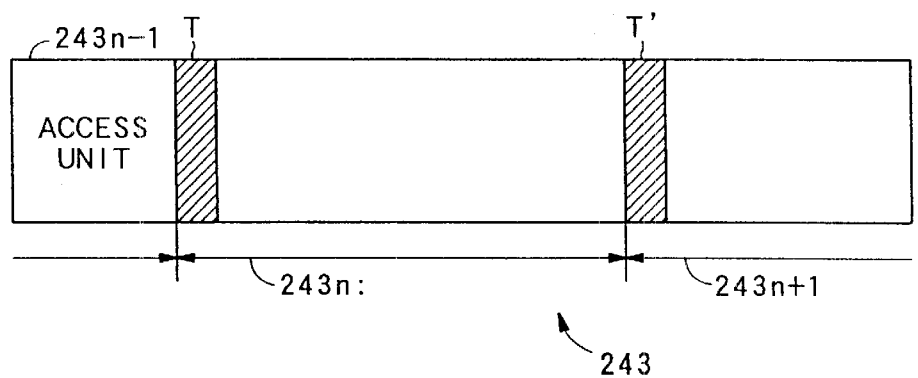
FIG. 2C is a diagram exemplifying a physical format of compressed audio data in the DVD audio of the embodiment.

Here, in FIG. 2C, the access unit $243_{n-1}$ is an access unit starting from the middle (the former access units other than it are recorded in a pack immediately before). The access unit $243_n$ is an access unit completed within this pack. The lead data T is the data at a lead of the access unit $243_n$. Moreover, the access unit $243_{n+1}$ is an access unit ending in the middle (the latter access units other than are recorded in a pack immediately after). Lead data T' is the data at a lead of the access unit $243_{n+1}$.

On the other hand, more concretely, as the information contained in the private header 242, as shown in FIG. 2B, there are sub-steam identification data 242a (one byte) which is a flag to identify that the information recorded following the private header 242 is the compressed audio information, reserved data areas 242b and 242g (a total of four bytes), private header length data 242c (one byte) indicative of a length of the private header 242 itself, a first access unit pointer 242d (two bytes) indicative of a record position within the compressed audio data 243 of the access unit to be firstly accessed at a time of reproduction within the compressed audio data 243, a forward search pointer 242e (one byte) as the forward position information indicative of a record position on the DVD audio 200 of a pack in which the lead data T of the access unit to be reproduced 1 sec. after with respect to the reproduction time of the access unit to be firstly accessed as a standard (i.e., the access unit $243_n$ in the example of FIG. 2C) is recorded, a backward search pointer 242f (one byte) as the backward position information indicative of a record position on the DVD audio 200 of a pack in which the lead data T of the access unit to be reproduced 1 sec. before is similarly recorded, and a stuffing byte 242h (eight bytes or less) which is dummy data to adjust a length of the private header 242 itself.

Here, the forward search pointer 242e and the backward search pointer 242f respectively describes the address information indicative of the record position of the audio pack 230 containing the lead data T of the access unit to be reproduced 1 sec. after or 1 sec. before, with respect to the audio pack 230 including the forward search pointer 242e and the backward search pointer 242f, as a relative address with respect to the audio pack 230 including the forward search pointer 242e and the backward search pointer 242f.

The reason of the establishment of the address information indicative of the record position of the audio pack 230 containing the lead data T of the access unit to be reproduced 1 sec. before (or 1 sec. after) is to effectively carry out a fast forward reproduction, a fast backward reproduction or the like without a feeling of physical disorder with regard to audible feeling, in the fast forward reproduction, the fast backward reproduction or the like of a later-described information reproducing apparatus.

That is, if the time duration or period is longer than 1 sec., this needs an unnecessary time duration from an actual jump until an arrival at a desirable reproduction time. On the other hand, in a case of an intermittent reproduction, since the intermittent time duration becomes longer, it becomes also unnatural. Moreover, if the period is shorter than 1 sec., a distance of one jump becomes shorter. Thus, depending on a case, the jump rather than the continuation of the reproduction in its original state delays a search of the audio information, and further delays the intermittent reproduction. Moreover, in the audio information, a frame traverse reproduction is not carried out differently from the video information. Hence, the reproduction at a unit less than 1 sec. has no meaning. A reproduction time specified by an audience or the like is a unit of 1 sec. Therefor, the value of 1 sec. is assumed to be optimal.

In the above-mentioned record format of the hierarchical structure shown in FIG. 1, each division can be freely set to record the information by a producer or author of the audio information to be recorded within the DVD audio 200 (hereafter, who is merely referred, to as an "author") in correspondence with his or her will. Then, various eventful reproductions can be carried out by the reproduction on the basis of a later-described logical structure for each division.

Next, a logical format (logical structure) constituted by a combination of the information recorded in accordance with the physical divisions shown in FIGS. 1 to 2C will be described below with reference to FIG. 3.

Figure 3:
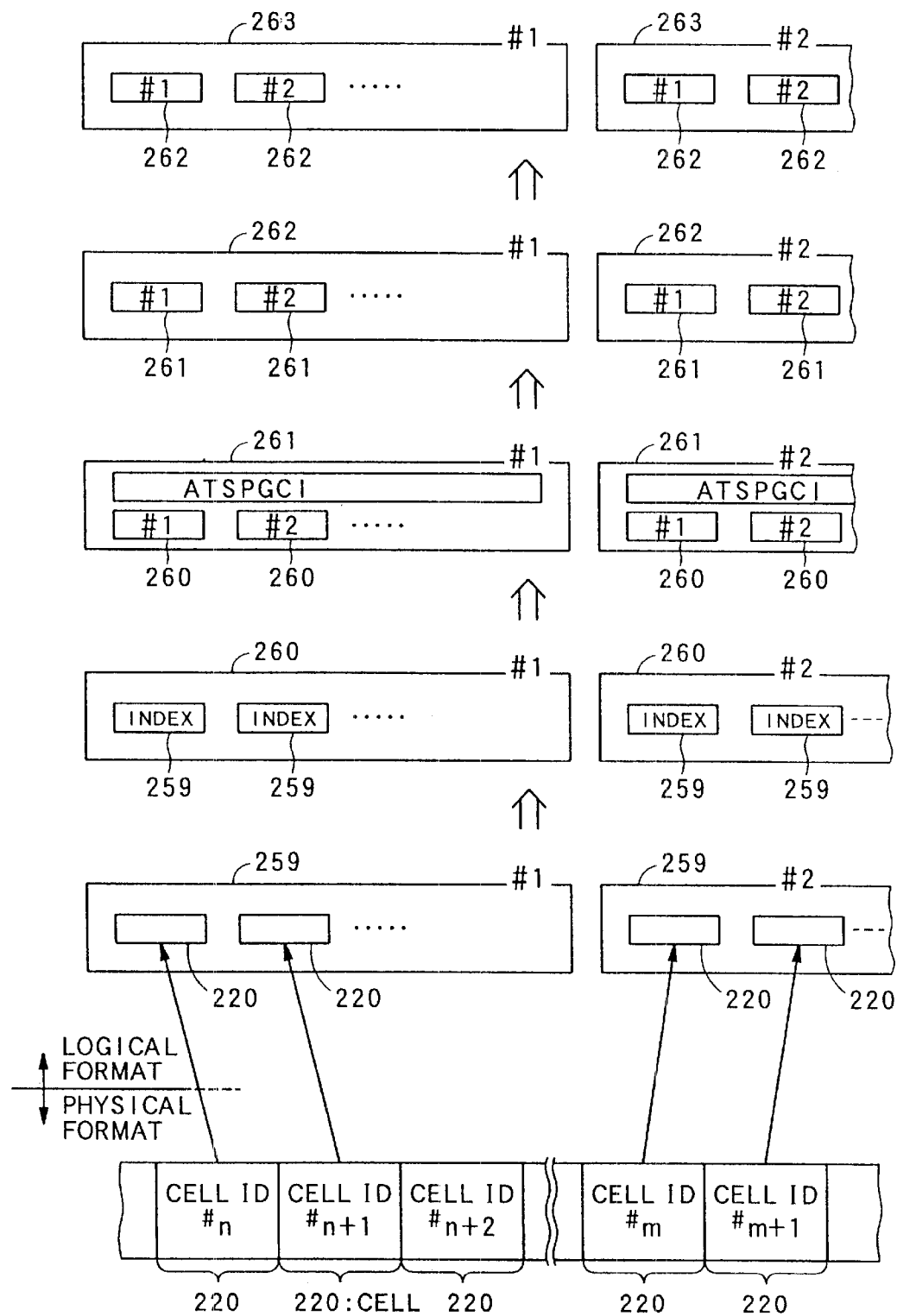
FIG. 3 is a diagram showing a logical format of the DVD audio of the embodiment.

In the logical structure shown in FIG. 3, the audio information is not actually recorded on the DVD audio 200 under such a structure. That is, the audio information is recorded on the DVD audio 200 by the physical formats shown in FIGS. 1 to 2C. Information to reproduce this audio information under the logical structure shown in FIG. 3 is recorded on the SAPPT 204, the AMG 202, the ATSI 211 and the like by the physical structures shown in FIGS. 2A to 2C.

For convenience of explanation, it is explained from a lower hierarchy in FIG. 3. Indexes 259 are logically constituted by selecting and combining one or a plurality of cells (or partial music compositions) 220 from among the physical structures shown in FIG. 1. At this time, the index 259 can be treated as a music composition number and implies a minimum unit that can be accessed by a selection of the audience. This index 259 is used, for example, to divide one music composition into portions, such as an introduction portion, a main portion and the like.

Next, one track 260 is logically constituted by one or a plurality of indexes 259. This track 260 is an information unit corresponding to one music composition. Then, the audience can select any track (i.e., any music composition) 260 to directly access it.

Here, the number of one cell 220 is treated as a cell ID number (indicated as a cell ID# in FIG. 1) when the cell 220 is treated by the physical format shown in FIG. 1, and treated as a cell number in a note order in a later-described ATSPGCI when the cell 220 is treated by the physical format shown in FIG. 3.

Also, the track 260 is an information unit including a plurality of cells 220, and is a set of the cells 220 having a certain common attribute and the like. That is, the attributes of all the cells 220 within the track 260 are all identical. Moreover, all the cells 220 included in the track 260 are recorded adjacently to each other, within the same area on the DVD audio 200.

Next, one title 261 is logically constituted by combining one or a plurality of tracks 260. At this time, the title 261 itself is never recognized by the audience as the unit of the access. Thus, each title 261 cannot be arbitrarily accessed, for example, by specifying the number of the title 261.

In the DVD audio 200, attributes of the respective tracks 260 constituting the title 261 can be defined independently of each other, from among a maximum of eight kinds of attributes. That is, it is possible to change the attributes as the audio information, such as the number of channels, a quantization method, a sampling frequency and the like, for each track 260.

The above-mentioned ATSPGCI is defined at a unit of this title 261. The ATSPGCI contains: the attributes of the respective tracks 260; a reproduction order of the cells 220 for each track 260 when each track 260 is reproduced; an address that is a record position on the DVD audio 200 of each cell 220; the number of the lead cell 220 to be reproduced in one track 260; the lead PTS of each track 260; a track reproduction time duration; a reproduction method; various commands; and the like. One title 261 contains the substantial audio information as a combination of the tracks 260 (in other words, as a combination of the cells 220), in addition to the above-mentioned ATSPGCI.

This ATSPGCI is recorded in the ATSI 211 within the ATS 203 in the physical structure of FIG. 1.

Next, one above-mentioned title group 262 is logically constituted by one or a plurality of titles 261. This title group 262 is a maximum unit which can be accessed by the audience. Then, a maximum of nine title groups 262 can be defined in a later-described volume 263. Here, the title group 262 is provided with one or a plurality of titles 261 assembled on the basis of a certain constant relationship. All the titles 261 within the title group 262 are reproduced in succession. Actually, for example, a music composition or song set of a certain singer, a certain musical composer and the like can be assembled as one title group 262.

Next, one above-mentioned volume 263 is logically constituted by one or a plurality of title groups 262. This volume 263 is an information unit corresponding to one side of one sheet of DVD audio disc.

Here, the substantial audio information included in the one title 261 shown in FIG. 3 is recorded within any one of ATSs 203 shown in FIG. 1 on the DVD audio 200.

A music composition which the audience listens to is generated when the author specifies the information division within each audio information divided or sorted in the physical structure shown in FIG. 1, in accordance with the logical format as mentioned above.

(II) Embodiment of Information Recording Apparatus

An embodiment of an information recording apparatus for manufacturing the DVD audio 200 which records thereon the audio information having the configurations shown in FIGS. 1 to 3 will be described below with reference to FIGS. 4 to 7.

Figure 4:
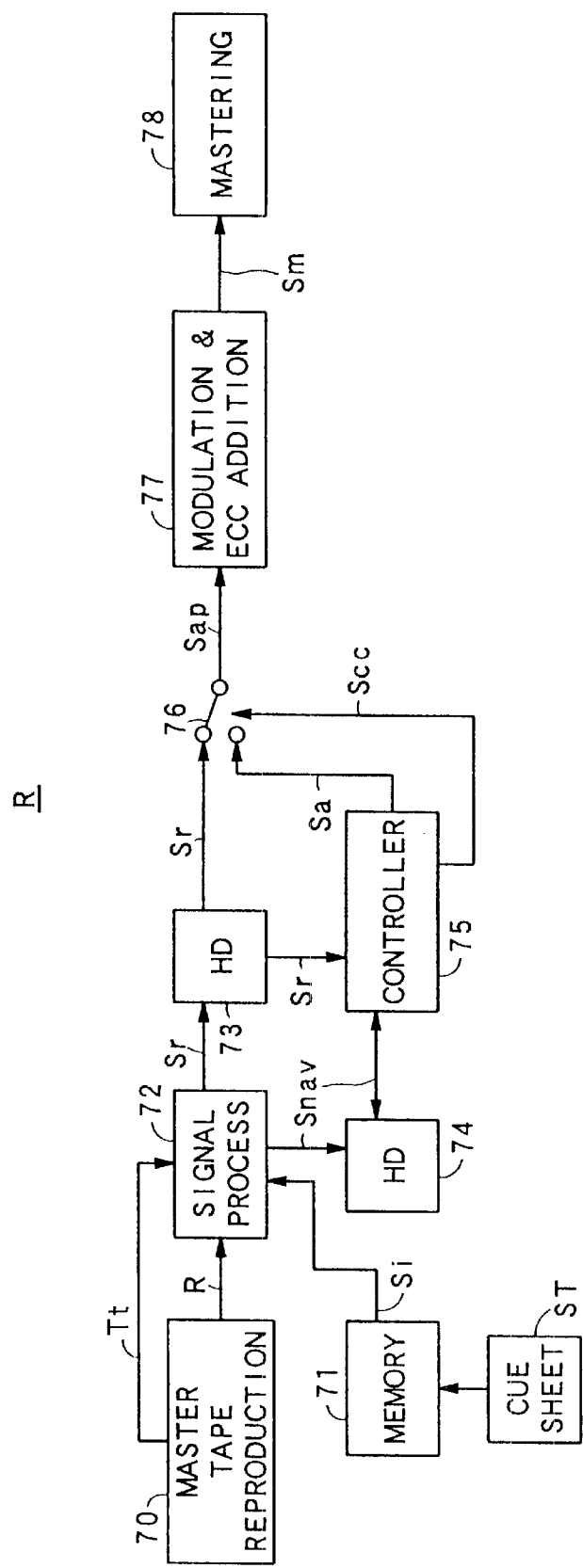
FIG. 4 is a block diagram showing a schematic configuration of an information recording apparatus of the embodiment.
Figure 5:
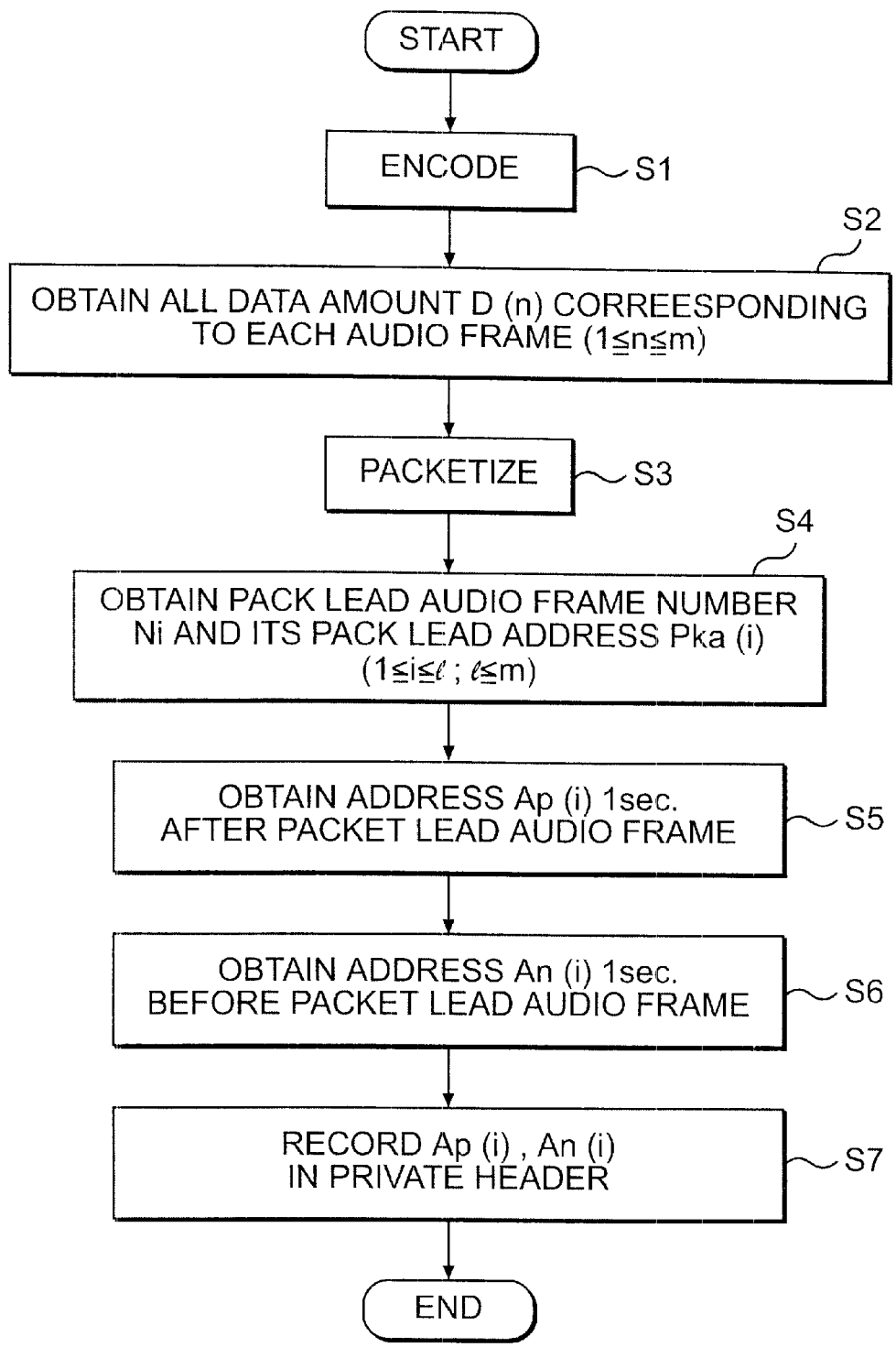
FIG. 5 is a flowchart showing an information recording process in the embodiment.
Figure 6:
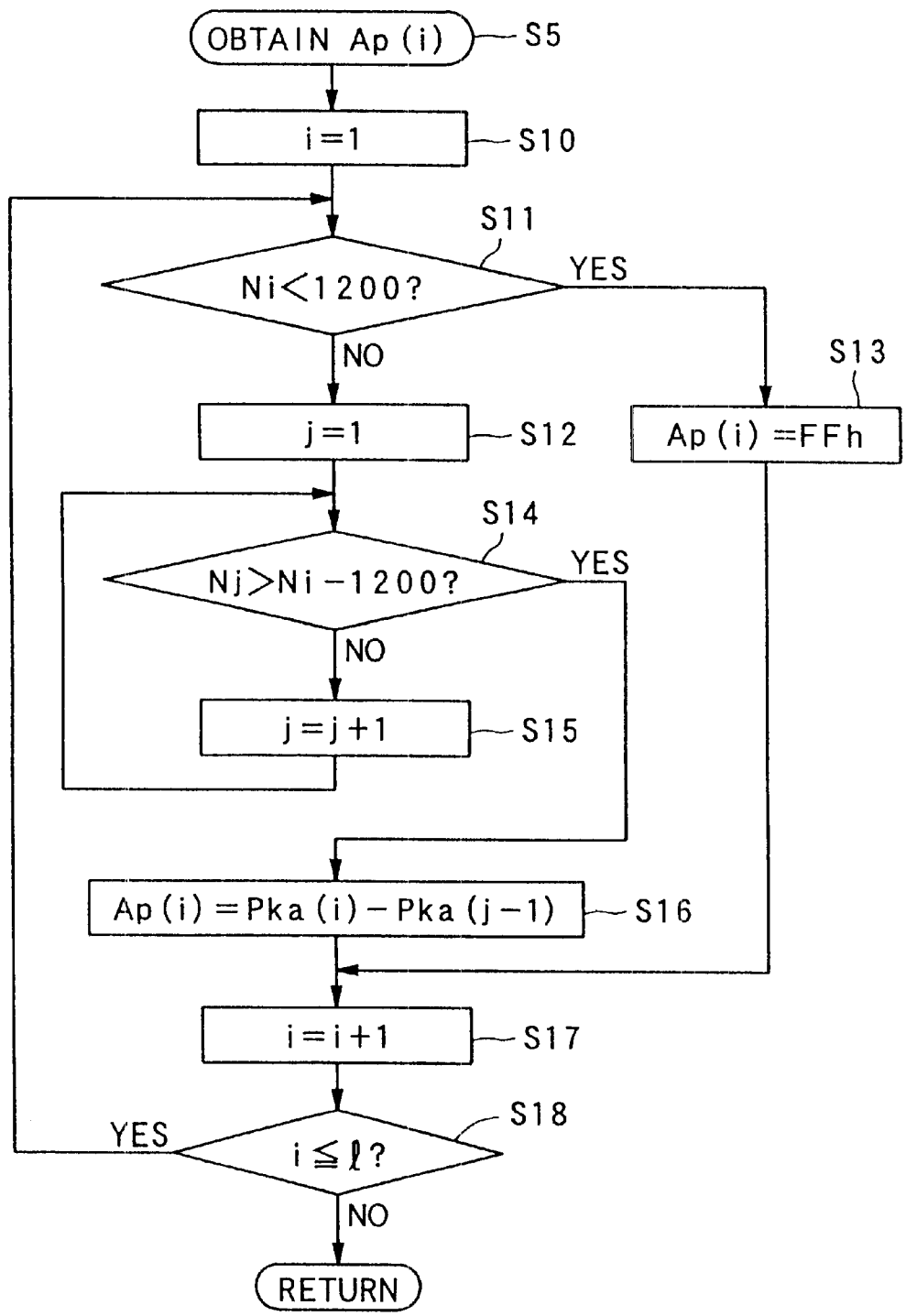
FIG. 6 is a flowchart showing a process of obtaining a forward search pointer in the embodiment.
Figure 7:
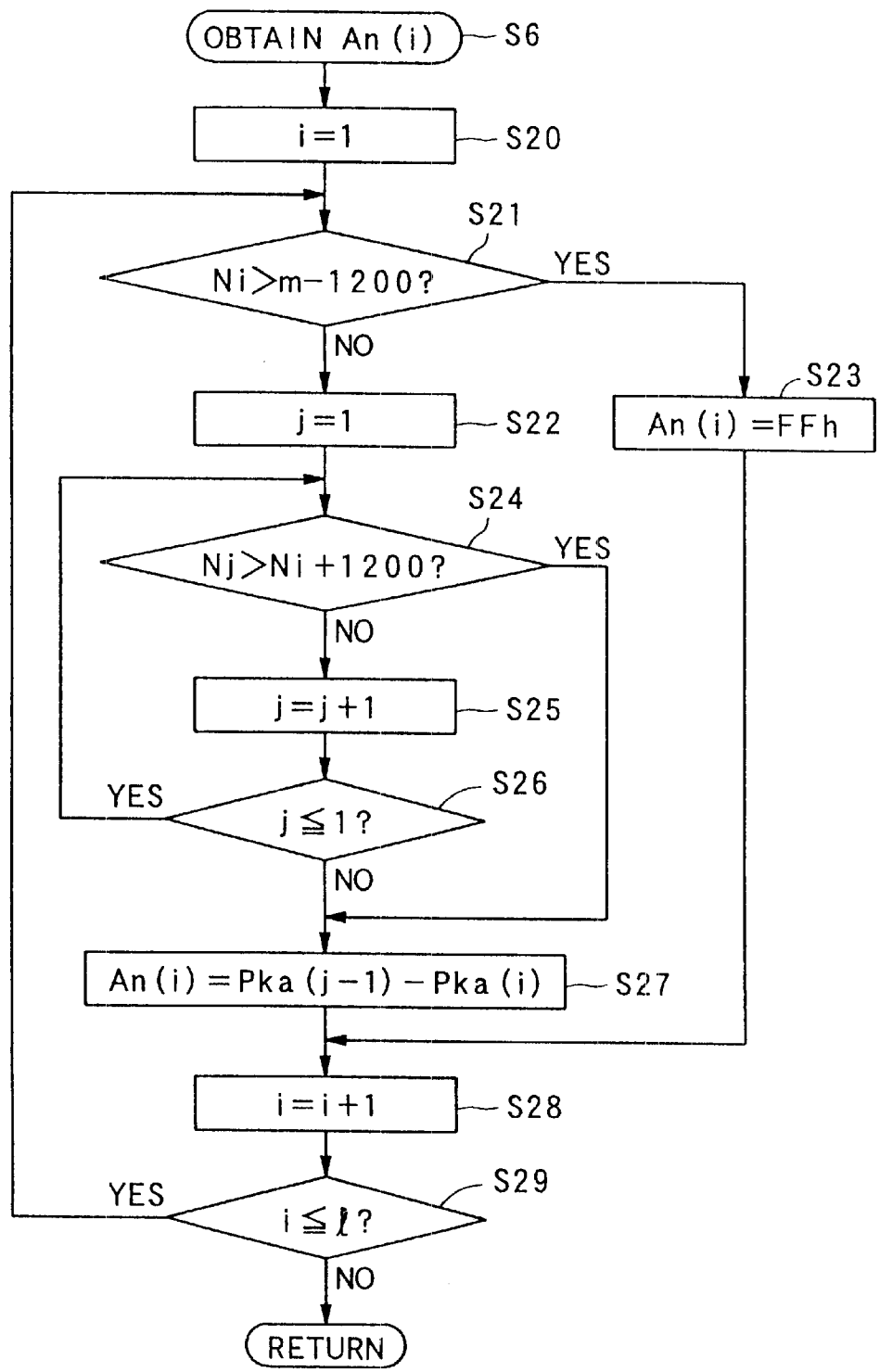
FIG. 7 is a flowchart showing a process of obtaining a backward search pointer in the embodiment.

FIG. 4 is a block diagram showing the schematic configuration of the information recording apparatus of the embodiment, and FIGS. 5 to 7 are flowcharts showing the operations of the information recording apparatus.

The information recording apparatus of the embodiment described below is an embodiment for recording the above-mentioned audio information onto a so-called stamper disc as a master (i.e., a cutting die) to mass-produce the DVD audio 200 on which the audio information is recorded (i.e., a disc manufacturing apparatus for manufacturing the stamper disc).

At first, the whole configuration and the operations of the information recording apparatus of the embodiment are described with reference to FIG. 4.

As shown in FIG. 4, an information recording apparatus R according to the embodiment is provided with a master tape reproduction unit 70, a memory 71, a signal process unit 72 serving as a reproduction control information generating device, a forward position information generating device and a backward position information generating device, hard disc devices 73 and 74, a controller 75, a multiplexer 76, a modulation & ECC (Error Correction. Code) addition unit 77 and a mastering device 78 serving as a recorder.

The operations will be described below.

The master tape reproduction unit 70 reproduces a master tape which records thereon the audio information (which is non-compressed audio information) R to be recorded onto the DVD audio 200, and then outputs it to the signal process unit 72 in accordance with a request from the signal process unit 72.

Next, the signal process unit 72 applies an A/D conversion onto the audio information outputted by the master tape reproduction unit 70 and then compresses it by using a predetermined variable length compression method (for example, the above-mentioned MPEG method) to thereby output it as a compression signal Sr. After that, the outputted compression signal Sr is transiently stored in the hard disk device 73.

In parallel with this, in accordance with a cue sheet ST in which the control information (including the SAPPT 204, the AMG 202 and the ATSI 211 in FIG. 1 and the like) to control a reproduction of the audio information R is described, the memory 71 transiently stores therein the control information which is inputted in advance, and then outputs it as a control information signal Si in accordance with the request from the signal process unit 72. This control information signal Si actually includes the information to divide the audio information R into the audio packs 230, in addition to the information serving as sources of the management information of the SAPPT 204, the AMG 202 and the ATSI 211.

By this, in accordance with a time code Tt corresponding to the audio information R outputted by the master tape reproduction unit 70 and the control information signal Si outputted by the, memory 71, the signal process unit 72 refers to the time code Tt, and thereby generates music composition time duration information from the control information included in the control information signal Si and the like, and further outputs (i) the management information, which includes them such as the SAPPT 204, the AMG 202, the ATSI 211 and the like, and (ii) each pack header 240, a packet header 241 and a private header 242 as a corresponding control information signal Snav. They are transiently stored in the hard disc device 74.

Then, the above-mentioned processes are executed for the whole audio information R.

Next, when the above-mentioned processes are ended for all the audio information R, the controller 75 reads out the compression signal Sr from the hard disc device 73, and also reads out the control information signal Snav from the hard disc device 74, and in accordance with them, finally generates (i) the music composition address information to be recorded in the management information such as the SAPPT 204, the AMG 202, the ATSI 211 and the like, (ii) the information to be included in each pack header 240, the packet header 241 and each private header 242 and the like, and then generates the final control information signal Snav, and again records it on the hard disc device 74. This process is executed by a fact that in the respective control information, there may be the information whose content is determined by the generation result of the compression signal Sr.

At this stage, the forward search pointer 242e and the backward search pointer 242f which should be inserted into the private header 240 are generated in consideration with the length of each access unit included in the compression signal Sr and the like, by a later-described process. They are again recorded on the hard disc device 74 as the control information signal Snav.

On the other hand, the controller 75 performs a time management on each operation of the signal process unit 72 and the hard disc devices 73 and 74, and then reads out addition information signal Sa (corresponding to the control information signal Snav which is transiently recorded in advance) including the control information signal Snav and outputs it. The controller 75 also reads out the compression signal Sr from the hard disc device 73 and outputs it, and further generates an information selection signal Scc for time-axis-multiplexing the compression signal Sr and the addition information signal Sa, and outputs it.

After that, the multiplexer 76 time-axis-multiplexes the compression signal Sr (including the compressed audio information) and the addition information signal Sa which are read out from the hard disc devices 73 and 74 respectively, in accordance with the information selection signal Scc from the controller 75, and outputs it as an information addition compression signal Sap. This process causes the management information, such as the SAPPT 204, the AMG 202, the ATSI 211 and the like, and the pack header 240, the packet header 241 and the private header 240 to be inserted into the compressed audio information within the compression signal Sr. Accordingly, the physical structure shown in FIG. 1 is completed as the audio information to be recorded onto the DVD audio disc.

After that, the modulation & ECC addition unit 77 performs an addition of an error correction code (ECC) such as a Reed-Solomon code, and also performs a modulation such as an 8–16 modulation on the outputted information addition compression signal Sap, and then generates a disc record signal Sm, and further outputs it to the mastering device 78.

Finally, the mastering device 78 records the disc record signal Sm onto the stamper disc. Then, the DVD audio 200 as a replica disc being typically marketed is manufactured by a replication apparatus (not shown) by using this stamper disc.

Next, among the above-mentioned operations of the information recording apparatus R, a process of generating the forward search pointer 242e and the backward search pointer 242f according to the present invention and a process of inserting them into the compressed audio information will be described below with reference to FIGS. 5 to 7.

In the process of generating the forward search pointer 242e and the backward search pointer 242f and the process of inserting them into the compressed audio information, at first, the signal process unit 72 encodes the non-compressed audio information R (in this case, the non-compressed audio information (of course, digital information) is assumed to be provided with a plurality of audio frames (a reproduction period of each off the audio frames is assumed to be $1/1200$ sec.) each including a constant sampling number), and also applies the variable length compression for each block into which the audio frame is further divided at an equal interval to thereby generate the compression signal Sr (Step S1).

Then, an entire data amount D(n) included in each audio frame within the compression signal Sr is calculated for each audio frame, and transiently stored in a memory (not shown) within the signal process unit 72 (Step S2). This process at the step S2 is carried out for each AOB 210. Here, a parameter n indicates a serial number from a lead of the AOB 210 of each audio frame to be included within one AOB 210. Thus, if the total number of all the audio frames included in the one AOB 210 is assumed to be m, the parameter n is as follows:

$1 \leq n \leq m$                      (n: a natural number)

Next, the compressed audio information is divided for each audio pack 230. Moreover, a so-called "packetize" or packeting for adding the pack header 240, the packet header 241, the private header 240 and the like is carried out (Step S3). At this time, the SAPPT 204, the AMG 202, the ATSI 211 etc., are also generated at the same time.

Then, the serial number Ni of the audio frame, which is located at a lead (namely, currently being reproduced) within the compressed audio data 243 within each audio pack 230 (packet), and an address Pka(i) on the DVD audio 200 at a lead of the audio pack 230 corresponding to the audio frame having this serial number Ni are obtained (Step S4).

In the DVD audio 200 of the embodiment, there may be a case that one AOB 210 is included in two or more titles 261 (this case is referred to as a common use of the AOB 210). Thus, the address of each audio pack 230 is set to be a value completed at a unit of the AOB 210. The address of a lead audio pack 230 within the one AOB 210 is always set to be an initial value in the address. Hence, the parameter Ni is also initialized and given at the unit of the AOB 210.

Moreover, if the total number of the audio packs 230 within one AOB 210 is assumed to be 1, the parameter i at the step S4 is as follows:

$1 \leq i \leq l, 1 \leq m$                  (l, m: natural numbers)

Next, with respect to the audio frame to be located at a lead of each audio pack 230, the address Ap(i) of the audio pack 230 including the audio frame to be reproduced 1 sec. after the audio frame is obtained (Step S5). Moreover, with respect to the audio frame to be located at the lead of each audio pack 230, the address An(i) of the audio pack 230 including the audio frame to be reproduced 1 sec. before the audio frame is obtained (Step S6). The processes at the steps S5, S6 will be described later in detail.

The obtained addresses Ap(i) and An(i) are recorded into the private header 242 as the forward search pointer 242e and the backward search pointer 242f, respectively. Then, the processes are ended (Step S7).

Next, the detailed portion of the process of obtaining the address Ap(i) at the step S5 will be described below with reference to FIG. 6.

As shown in FIG. 6, in the step S5, the parameter i indicative of the serial number of each audio pack 230 within the one AOB 210 is firstly initialized (Step S10). Next, it is judged whether or not the number Ni of the audio frame located at the lead of the obtained audio pack 230 is smaller than 1200 (namely, the total number of audio frames reproduced for 1 sec.) (Step S11)

Then, if it is judged in the judgment at the step S11 that the number Ni of the audio frame is smaller than 1200 (Step S11: YES), it is determined that an audio frame 1 sec. after the audio frame is not present in the AOB 210 to which the audio frame belongs (in other words, the audio frame is present within 1 sec. from the lead of the AOB 210). Thus, the address Ap(i) is set to be "FFh (h implies a hexadecimal number)" (Step S13). Then, the operational flow proceeds to a step S17.

On the other hand, if it is judged in the judgment at the step S11 that the number Ni of the audio frame is not smaller than 1200 (Step S11: NO), it is determined that an audio frame 1 sec. before the audio frame is present in the AOB 210 to which the audio frame belongs. Next, a parameter j is initialized which tentatively indicates the serial number of the audio pack 230 including the audio frame 1 sec. after (Step S12).

Then, it is judged whether or not the number Nj of the audio frame located at a lead within the compressed audio data 243 within the audio pack 230 including the audio frame 1 sec. after is greater than a value in which 1200 is subtracted from the serial number i of the audio frame (Step S14). If it is not greater (Step S14: NO), it is determined that the audio frame indicated by the number Nj is the audio frame to be reproduced earlier than 1 sec. after the audio frame (audio frame currently being reproduced) indicated by the number Ni. Thus, a value of the parameter j is incremented (Step S15). Again, the operational flow returns back to the step S14.

The processes at the steps S14 and S15 are the process to detect the serial number of the audio frame to be reproduced 1 sec. after the audio frame currently being reproduced.

On the other hand, if it is judged in the judgment at the step S14 that the number Nj of the audio frame is greater than the value in which 1200 is subtracted from the number Ni of the audio frame (Step S14: YES), it is determined that the audio pack including the audio frame indicated by the number Nj is an audio pack next to the audio pack including the audio frame to be reduced 1 sec. after the audio frame currently being reproduced. Next, the address Pka(j−1) on the DVD audio 200 at the lead of the audio pack 230 after the audio pack including the audio frame having the number Nj is subtracted from the address Pka(i). Then, this is set to be an address (relative address) Ap(i) as the forward search pointer 242*e* (Step S16).

Then, the parameter i is incremented (Step S17). Moreover, it is checked whether or not the value of the parameter i is equal to or less than the above-mentioned value 1, namely, whether or not the obtainment of the address Ap(i) is completed for all the audio packs 230 within the one AOB 210 (Step S18). If the obtainment is completed i.e., i>1(Step S18; NO), the operational flow proceeds to the step S6 as it is. On the other hand, if-the obtainment is not completed i.e., i≦1 (Step S18; YES), the operational flow again returns back to the step S11, and repeats the above-mentioned operations.

Next, the detailed portion of the process of obtaining the address An(i) at the step S6 will be described below with reference to FIG. 7.

As shown in FIG. 7, in the step S6, the parameter i indicative of the number of each audio pack 230 within the one AOB 210 is firstly initialized (Step S20). Next, it is judged whether or not the number Ni of the audio frame located at the lead of the obtained audio pack 230 is greater than "m-1200" (Step S21).

Then, if it is judged in the judgment at the step S21 that the number Ni of the audio frame is greater than "m-1200" (Step S12: YES), it is determined that an audio frame 1 sec. before the audio frame is not present in the AOB 210 to which the audio frame belongs (in other words, the audio frame is located at a reproduction position 1 sec. before from the end portion of the AOB 210), and the address An(i) is set to be "FFh (h implies a hexadecimal number)" (Step S23). Then, the operational flow proceeds to a step S28. On the other hand, if it is judged in the judgment at the step S21 that the number Ni of the audio frame is not greater than "m-1200" (Step S21: NO), it is determined that an audio frame 1 sec. before the audio frame is present in the AOB 210 to which the audio frame belongs. Next, the parameter j tentatively indicating the serial number of the audio pack 230 including the audio frame 1 sec. before is initialized (Step S22).

Then, it is judged whether or not the number Nj of the audio frame located at a lead within the compressed audio data 243 within the audio pack 230 including the audio frame 1 sec. before is greater than a value in which the number Ni of the audio frame and 1200 are added to each other (Step S24). If it is not greater (Step S24: NO), it is determined that the audio frame indicated by the number Nj is an audio frame to be reproduced earlier than 1 sec. before the audio frame (audio frame currently being reproduced) indicated by the number Ni. Thus, a value of the parameter j is incremented (Step S25). Moreover, it is checked whether or not the value of the parameter j is equal to or less than the above-mentioned value 1, namely, whether or not the process at the step S24 is completed for all the audio packs 230 within the one AOB 210 (Step S26). If the process is completed i.e., j>1 (Step S26; NO), the operational flow proceeds to the step. S27 as it is. On the other hand, if the process is not completed i.e., i≦1 (Step S25; YES), the operational flow again returns back to the step S24. The processes at the steps S24 and S25 are the process to calculate the serial number of an audio frame before the audio frame to be reproduced 1 sec. before the audio frame currently being reproduced.

On the other hand, if it is judged in the judgment at the step S24 that the number Nj of the audio frame is greater than the value in which the number Ni of the audio frame and 1200 are added to each other (Step S24: YES), it is determined that an audio pack including the audio frame indicated by the number Nj is an audio pack next to an audio pack including the audio frame to be reduced 1 sec. before the audio frame currently being reproduced. Next, an address Pka(i) is subtracted from an address Pka(j−1) on the DVD audio 200 at a lead of an audio pack 230 before the audio pack including the audio frame having the number Nj. Then, this is set to be an address (relative address) An(i) as the backward search pointer 242*f* (Step S27).

Then, the parameter i is incremented (Step S28). Moreover, it is checked whether or not the value of the parameter i is equal to or less than the above-mentioned value 1, namely, whether or not the obtainment of the address An(i) is completed for all the audio packs 230 within the one AOB 210 (Step S29). If the obtainment is completed i.e., i>1 (Step S29; NO), the operational flow proceeds to the step S7 as it is. On the other hand, if the obtainment is not completed i.e., i≦1 (Step S29: YES), the operational flow again returns back to the step S21, and repeats the above-mentioned operations.

(III) Embodiment of Information Reproducing Apparatus

An embodiment of an information reproducing apparatus for reproducing the audio information recorded on the above-mentioned DVD audio 200 will be described below with reference to FIGS. 8 to 14.

Figure 8:
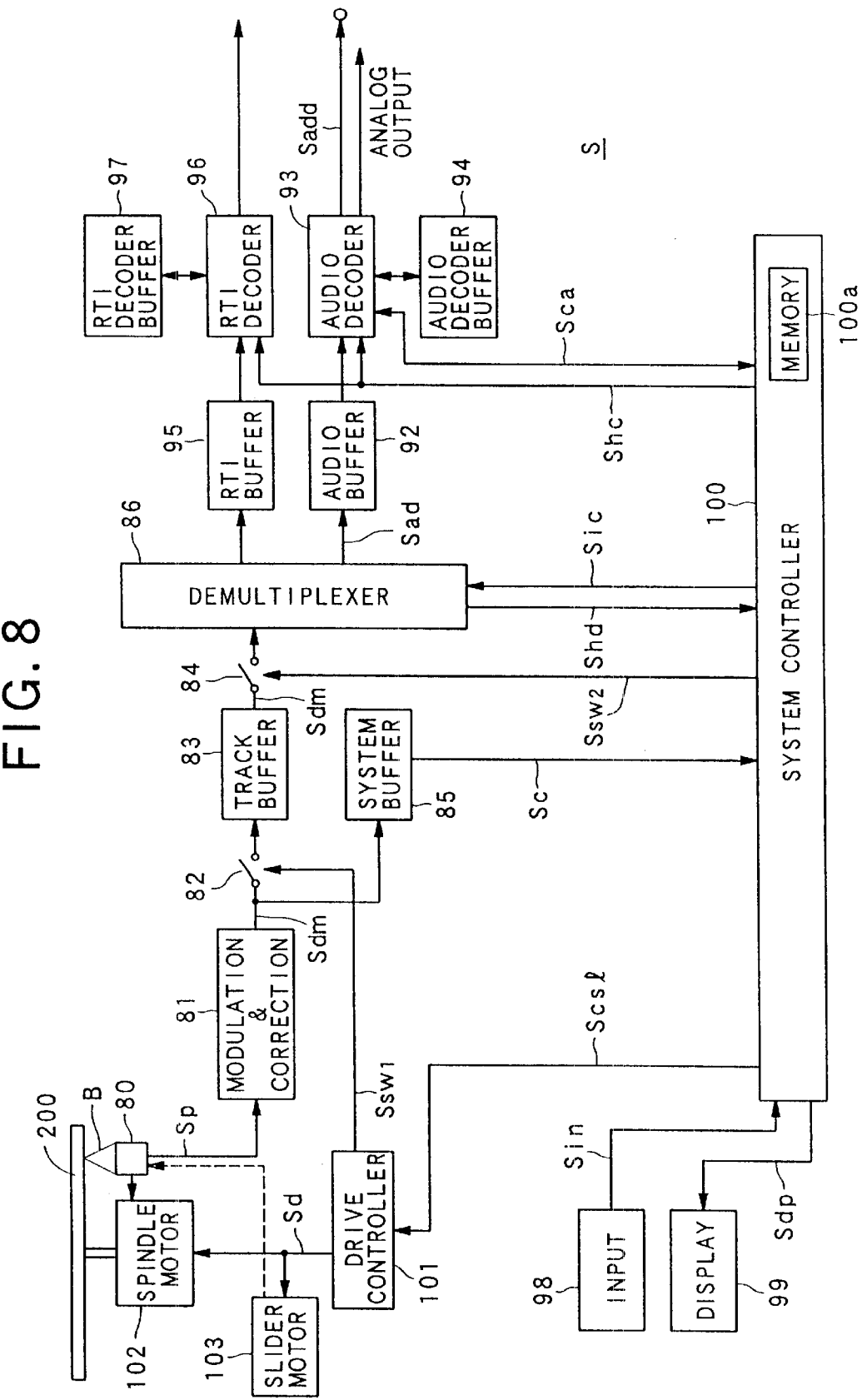
FIG. 8 is a block diagram showing a schematic configuration of an information reproducing apparatus of the embodiment.
Figure 9:
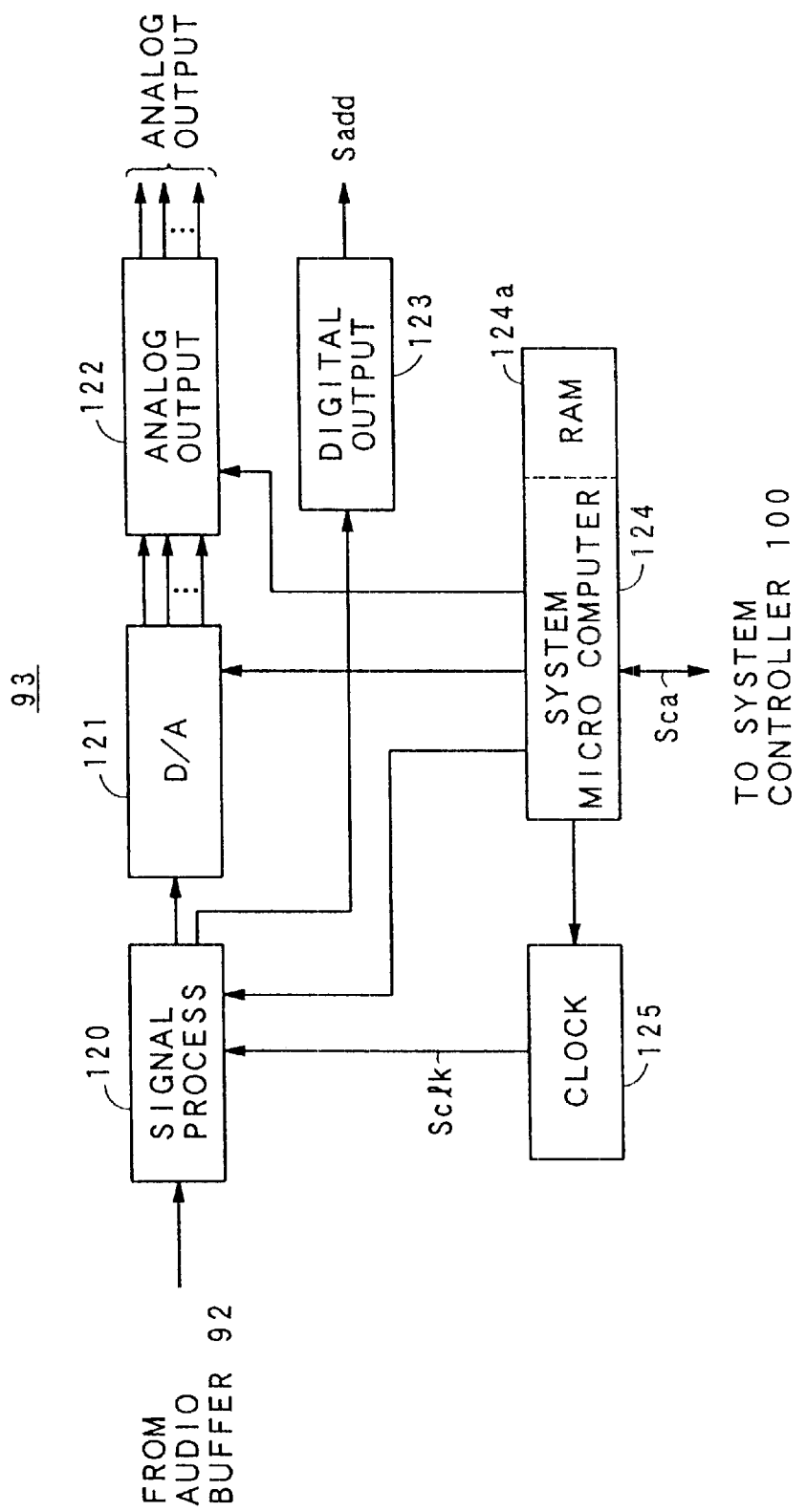
FIG. 9 is a block diagram showing a schematic configuration of an audio decoder in the information reproducing apparatus of the embodiment.

FIG. 8 is a block diagram showing the whole configuration of the information reproducing apparatus. FIG. 9 is a block diagram showing the configuration of the detailed portion of an audio decoder. FIGS. 10 to 13 are flowcharts showing the operations of the information reproducing apparatus in the embodiment. FIG. 14 is a diagram describing the operations of a time search reproduction.

The information reproducing apparatus of the embodiment described below can carry out, by using the forward search pointer 242e or the backward search pointer 242f according to the present invention, a fast backward reproduction (namely, the reproduction consisting of repetition of jumping to the audio frame to be reproduced 1 sec. before and also reproducing this for a predetermined time duration (for example, 0.2 sec.) and further jumping to the audio frame to be reproduced 1 sec. before, by use of the backward search pointer 242f) or a fast forward reproduction (namely, the reproduction consisting of repetition of jumping to the audio frame to be reproduced 1 sec. after and also reproducing this for a predetermined time duration and further jumping to the audio frame to be reproduced 1 sec. after by use of the forward search pointer 242e) or a so-called time search reproduction for specifying in advance an audio frame to be reproduced and then jumping to it and further reproducing it, in addition to the usual reproduction of the audio information recorded on the DVD audio 200.

At first, the whole configuration and the operations of the information reproducing apparatus in the embodiment are described with reference to FIGS. 8 and 9.

As shown in FIG. 8, an information reproducing apparatus S according to the embodiment is provided with: an optical pickup 80 serving as a detector, a first detector and a second detector; a demodulation & correction device 81; stream switches 82 and 84; a track buffer 83; a system buffer 85; a demultiplexer 86; an audio buffer 92; an audio decoder 93 serving as a reproducing device; an audio decoder buffer 94; an RTI (Real Time Information) buffer 95; an RTI decoder 96; an RTI decoder buffer 97; an input device 98; a display 99; a system controller 100 serving as a controller and a searching device; a drive controller 101, a spindle motor 102; and a slider motor 103.

As shown in FIG. 9, the audio decoder 93 is provided with: a signal process unit 120 containing a digital filter and the like; a D/A converter 121; an analog output circuit 122 containing an amplifier and the like; a digital output circuit 123; a system micro computer 124 containing a RAM 124a; and a clock circuit 125.

Only the sections with regard to the reproduction of the audio information in the information reproducing apparatus S are represented in the configurations shown in FIGS. 8 and 9. The optical pickup 80 and the servo circuit for servo-controlling the spindle motor 102, the slider motor 103 and the like are similar to those of the conventional technology. Thus, their description and detailed explanations are omitted.

The operations will be described below.

The optical pickup 80 contains a laser diode, a beam splitter, an objective lens and a light detector (which are not shown) and so on, and irradiates a light beam B as a reproduction light onto the DVD audio 200, and also receives a reflection light from the DVD audio 200 of the light beam B, and further outputs a detection signal Sp corresponding to an information pit formed on the DVD audio 200. At this time, in such a way that the light beam B is accurately irradiated onto an information track on the DVD audio 200 and also a focal point is accurately generated on an information record surface of the DVD audio 200, a tracking servo control and a focus servo control are applied to the objective lens (not shown) in the same manner as a conventional technology.

Next, the detection signal Sp outputted by the optical pickup 80 is inputted to the demodulation & correction device 81. Then, a demodulation process and an error correction process are applied onto it to thereby generate a demodulation signal Sdm, which is outputted to the stream switch 82 and the system buffer 85.

In the stream switch 82 receiving the demodulation signal Sdm, the open/close thereof is controlled in accordance with a switch signal Ssw1 from the drive controller 101. If the stream switch 82 is closed, the input demodulation signal Sdm is passed through as it is, and is outputted to the track buffer 83. On the other hand, if the stream switch 82 is opened, the demodulation signal Sdm is not outputted. Thus, an unnecessary information (signal) is never inputted to the track buffer 83.

Next, the track buffer 83 into which the demodulation signal Sdm is inputted is composed of FIFO (First In First Out) memories and the like. Then, it transiently stores the input demodulation signal Sdm. Also, if the stream switch 84 is closed, the track buffer 83 outputs the stored demodulation signal Sdm in succession.

In the stream switch 84 into which the demodulation signal Sdm is inputted in succession, the open/close thereof is controlled in accordance with a switch signal Ssw2 from the system controller 100 so that, in a separation process in the demultiplexer 86, a decoding process is not stopped by the overflow condition in various buffers at latter stages thereof or the empty condition.

On the other hand, the system buffer 85, into which the demodulation signal Sdm is inputted in parallel with the track buffer 83, accumulates (i) the management information (AMG 202 and the like) with regard to the whole information which is firstly detected at a time of loading the DVD audio 200 and recorded on the DVD, audio 200 or (ii) the ATSI 211 for each ATS 203, to thereby output it to the system controller 100 as first reproduction control information Sc.

By these, the demultiplexer 86 continuously receives the demodulation signal Sdm through the stream switch 84 and extracts the compressed audio information for each audio pack 230 from the demodulation signal Sdm, and then outputs it to the audio buffer 92 as an audio signal Sad.

At this time, the demultiplexer 86 extracts the pack header 240, the packet header 241 and the like from each audio pack 230 and packet, and then outputs the reproduction control information included in the respective headers, as a header signal Shd to the system controller 100.

Next, the audio buffer 92, to which the audio signal Sad is inputted, is composed of FIFO memories etc., and transiently stores the inputted audio signal Sad, and then outputs it to the audio decoder 93.

Then, the audio decoder 93 applies the, recovery or expansion process and the demodulating process which correspond to the variable length compression and the like onto the audio signal Sad, in accordance with control signals Shc and Sca outputted by the system controller 100, and then outputs it as a demodulation audio signal Sadd to a speaker (not shown) and the like.

On the other hand, the above-mentioned real time information, for example, such as a real time text and the like, is outputted by the demultiplexer 86 to the RTI buffer 95. Then, the real time information transiently accumulated in the RTI buffer 95 is outputted to the RTI decoder 96 in accordance with the control signal Shc outputted by the system controller 100, and is further outputted to a display (not shown) and the like. Then, words of a song and the like are displayed.

If it is detected that a stop (pause) of the audio sound output is needed in a reproduction immediately after an access to desired information and the like, the system controller 100 outputs a pause signal (not shown) to the audio decoder 93. This audio decoder 93 transiently stops the output of the demodulation audio signal Sadd.

Next, the actual processes in the audio decoder 93 will be described below.

In the above-mentioned process of the audio decoder 93, the system micro computer 124 sends and receives the control signal Sca (including the private header information demodulated by the signal process unit 120) to and from the system controller 100, and also sends and receives the information to and from the audio decoder buffer 94. Along with this, the system micro computer 124 controls operations of the clock circuit 125 for generating a clock signal Sclk serving as a standard clock for the process in the signal process unit 120, the signal process unit 120 for actually carrying out the recovery or expansion process and the demodulating process, the D/A converter 121 for converting the demodulated audio information into the analog signal, and the analog output circuit 122 for applying an amplification process and the like onto the analog audio information.

Here, the system micro computer 124 has the RAM 124*a* therein. The RAM 124*a* transiently stores the audio attribute information sent as a part of the control signal Sca from the system controller 100. Then, the system micro computer 124 refers to the audio attribute information stored in the RAM 124*a*, and sends the content thereof to the clock circuit 125 and the signal process unit 120.

More actually, the system micro computer 124 sends the sampling frequency information in the audio attribute information to the clock circuit 125. The clock circuit 125 having an oscillator sends the clock signal Sclk corresponding to an instructed sampling frequency to the signal process unit 120.

In parallel with this, the system microcomputer 124 sends the information, which indicates the sampling frequency in the audio attribute information, the quantization bit number, the total number of the channels and the presence or absence of emphasis, to the signal process unit 120, and also sends the information indicative of the number of the channels to the D/A converter 121.

Moreover, the system micro computer 124 sends the information, which indicates the amplification degree of a signal of each channel and the like, to the analog output circuit 122. At this time, the information indicative of the amplification degree for each channel can be included in the audio attribute information and can be sent by the system controller 100.

The forward search pointer 242*e* and the backward search pointer 242*f* which are included in the private header are demodulated by the signal process unit 120, and are outputted as the control signal Sca through the system micro computer 124 to the system controller 100, and are then used for the fast backward reproduction, the fast forward reproduction or the time search reproduction, as described later.

On the other hand, the signal process unit 120 carries out the processes such as the recovery or expansion process of the compression audio signal sent by the audio buffer 92, the decoding process, the band limitation process and so on, by using the clock signal Sclk from the clock circuit 125, in accordance with the information indicative of the encoding method corresponding to the variable length compression method, the sampling frequency, the quantization bit number and the like obtained from the system micro computer 124. The signal process unit 120 further carries out the de-emphasizing process in accordance with the information of the presence or absence of the emphasis, and outputs it to the D/A converter 121. Moreover, the signal process unit 120 demodulates the private header 242, and then sends it as the control signal Sca to the system micro computer 124.

In parallel with this, the signal process unit 120 outputs the digital audio signal Sadd through the digital output circuit 123 to the external portion.

Then, the D/A converter 121 divides the inputted signal for each channel, in accordance with the channel information obtained from the system micro computer 124, and further outputs it to the analog output circuit 122 as the analog signal for each channel.

Next, the detailed processes of the fast backward reproduction, the fast forward reproduction and the time search reproduction which are carried out in the information reproducing apparatus S by using, the forward search pointer 242*e* or the backward search pointer 242*f* in the private header 242 will be described below with reference to FIGS. 10 to 14.

Figure 10:
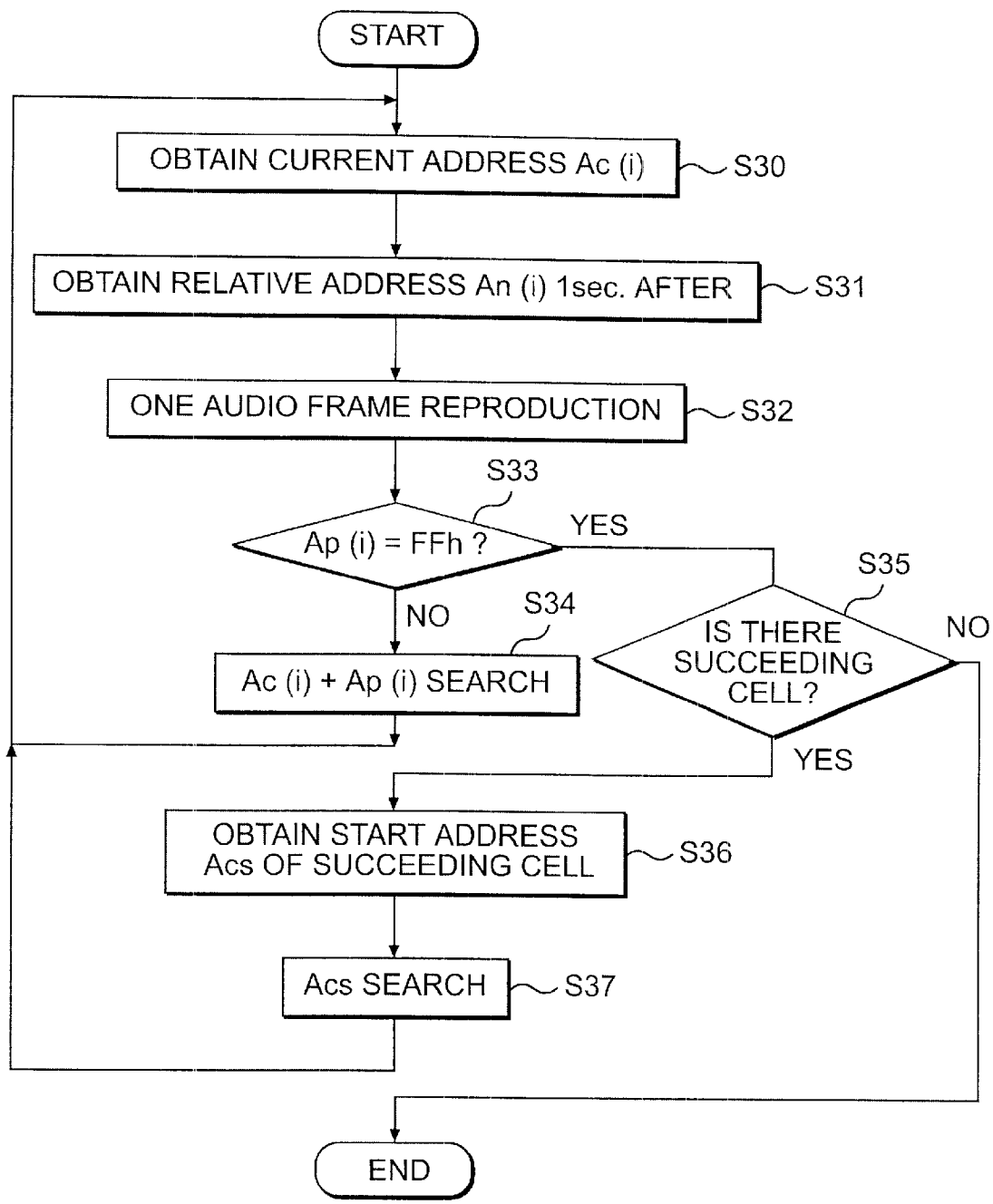
FIG. 10 is a flowchart showing a process in a fast forward reproduction in the embodiment.
Figure 11:
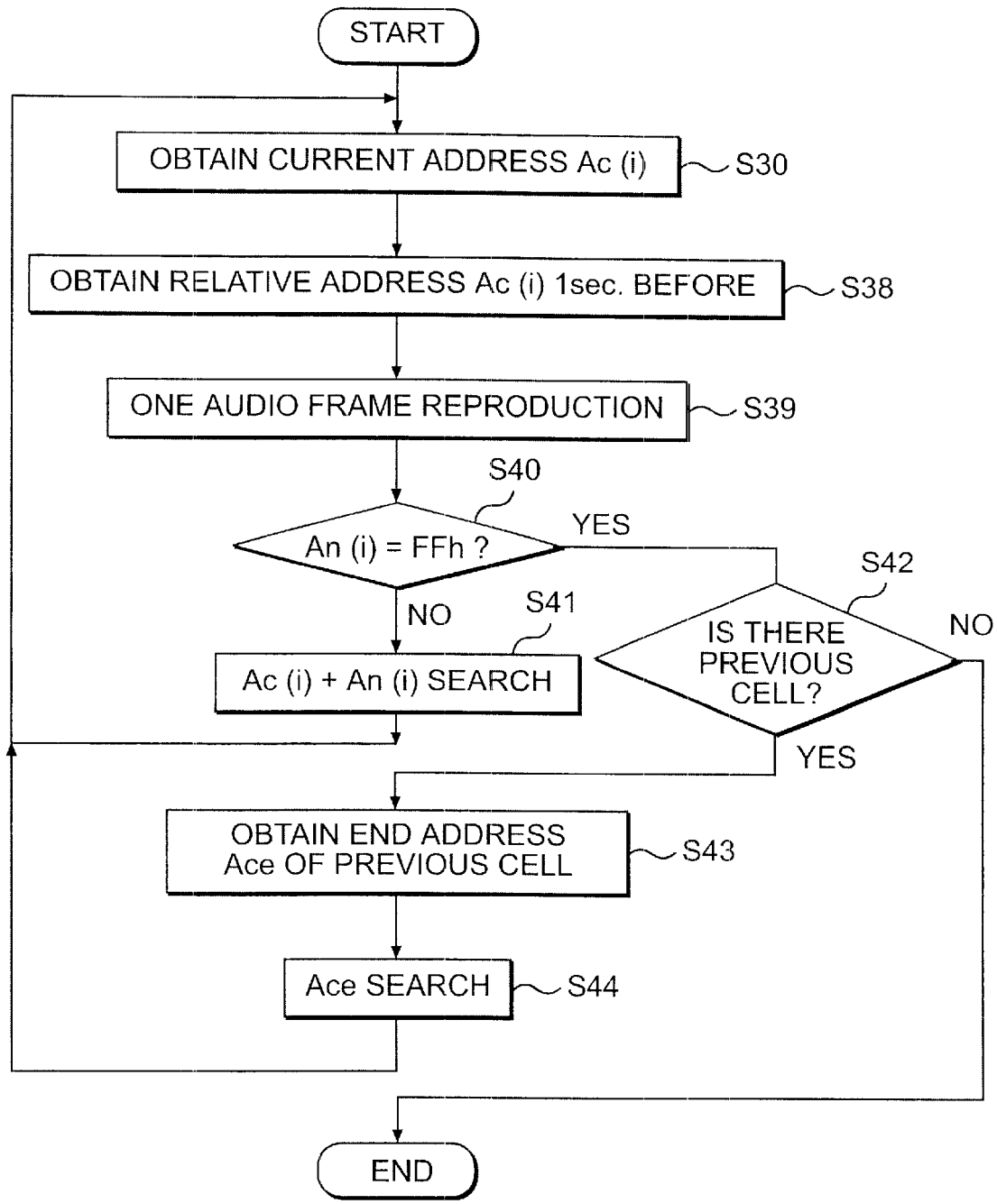
FIG. 11 is a flowchart showing a process in a fast backward reproduction in the embodiment.

At first, the processes of the fast forward reproduction are described with reference to the flowchart shown in FIG. 10.

In the fast forward reproduction of the information reproducing apparatus S, an address Ac(i) of an audio frame currently being reproduced is obtained at first (Step S30). Here, a parameter i indicatives the serial number of an audio pack 230 including the audio frame currently being reproduced, similarly to the case of generating the forward search pointer 242*e* and the backward search pointer 242*f* in the above-mentioned information recording apparatus R.

Next, when the backward search pointer 242*f* within the private header 242 is detected by the system micro computer 124, a relative address Ap(i) on the DVD audio 200 of an audio pack to be reproduced 1 sec. after is obtained (Step S31).

Then, the compressed audio information within one audio frame currently being reproduced are all reproduced (Step S32). Next, it is judged whether or not the value of the obtained address An(i) is "FFh" (Step DS33).

If it is judged in the judgment at the step S33 that the value of the address Ap(i) is "FFh" (Step S33; YES), it is determined that the audio frame currently being reproduced is an audio frame to be reproduced later than 1 sec. after the end portion of one AOB 210. Then, without using the forward search pointer 242*e*, it is checked whether or not there is another succeeding cell 220 by referring to the management information within the AMG 202 and the ATSI 211 which are the management information (Step S35). If there is no succeeding cell 220 (Step S35: NO), it is determined that the fast forward reproduction cannot be carried out any longer, and then the process is ended.

On the other hand, if it is judged in the judgment at the step S35 that there is the succeeding cell 220 (Step S35:

Yes), an address Acs of the start position of the succeeding cell 220 is obtained, for example, by referring to the management information within the AMG 202 and the ATSI 211 (Step S36). Moreover, the obtained address Acs is searched (Step S37). In order to carry out the fast forward reproduction with the searched address Acs as a start point, the operational flow returns to the step S30.

If it is judged in the judgment at the step S33 that the value of the address An(i) is not "FFh" (Step S33: NO), it is determined that there is another audio frame to be reproduced 1 sec. after, within an AOB 210 to which the audio frame currently being reproduced belongs. Then, the forward search pointer 242e is used to search an address "Ac(i)+Ap(i)" to be next searched (Step S34). In order to carry out the fast forward reproduction with the searched address "Ac(i)+Ap(i)" as a start point, the operational flow returns back to the step S30.

The fast forward reproduction using the forward search pointer 242e is carried out by the above-mentioned processes.

Next, when the backward search pointer 242f within the private header 242 is detected by the system micro computer 124, a relative address An(i) on the DVD audio 200 of an audio pack to be reproduced 1 sec. before is obtained (Step S38).

Then, the compressed audio information within the one audio frame currently being reproduced are all reproduced (Step S39). Next, it is judged whether or not the value of the obtained address An(i) is "FFh" (Step S40).

If it is judged in the judgment at the step S40 that the value of the address An(i) is "FFh" (Step S40: YES), it is determined that the audio frame currently being reproduced is an audio frame to be reproduced earlier than 1 sec. before a lead of one AOB 210. Then, without using the backward search pointer 242f, it is checked whether or not there is another cell 220 reproduced immediately before, for example, by referring to the management information within the AMG 202 and the ATSI 211 (Step S42). If there is no cell 220 reproduced immediately before (Step S42: NO), it is determined that the fast backward reproduction cannot be carried out any longer, and then the process is ended.

On the other hand, if it is judged in the judgment at the step S42 that there is the cell 220 reproduced immediately before (Step S42), an end address Ace of the cell 220 reproduced immediately before (namely, a start address of an end audio frame in the reproduced cell 220) is obtained, for example, by referring to the management information within the AMG 202 and the ATSI 211 (Step S43). Moreover, the obtained address Ace is searched (Step S44). In order to carry out the fast backward reproduction with the searched address Ace as a start point, the operational flow returns back to the step S30.

In the process at the step S43, the end address of the cell 220 reproduced immediately before is not described in the DVD audio 200. So, in the actual process, at first, a jump is performed to an address in which the maximum value of the sizes of the audio frames is subtracted from the end address of the cell 220 itself reproduced immediately before. Then, a lead of an audio frame firstly detected after its position is recognized as the end address of the cell 220 reproduced immediately before.

If it is judged in the judgment at the step S40 that the value of the address An(i) is not Ad "FFh" (Step S40: NO), it is determined that there is another audio frame reproduced 1 sec. before, within an AOB 210 to which the audio frame currently being reproduced belongs. Then, the backward search pointer 242f is used to search an address "Ac(i)–An(i)" to be next searched (Step S41). In order to carry out the fast backward reproduction with the searched address "Ac(i)–An(i)" as a start point, the operational flow returns back to the step S30.

The fast backward reproduction using the backward search pointer 242f is carried out by the above-mentioned processes.

Figure 12:
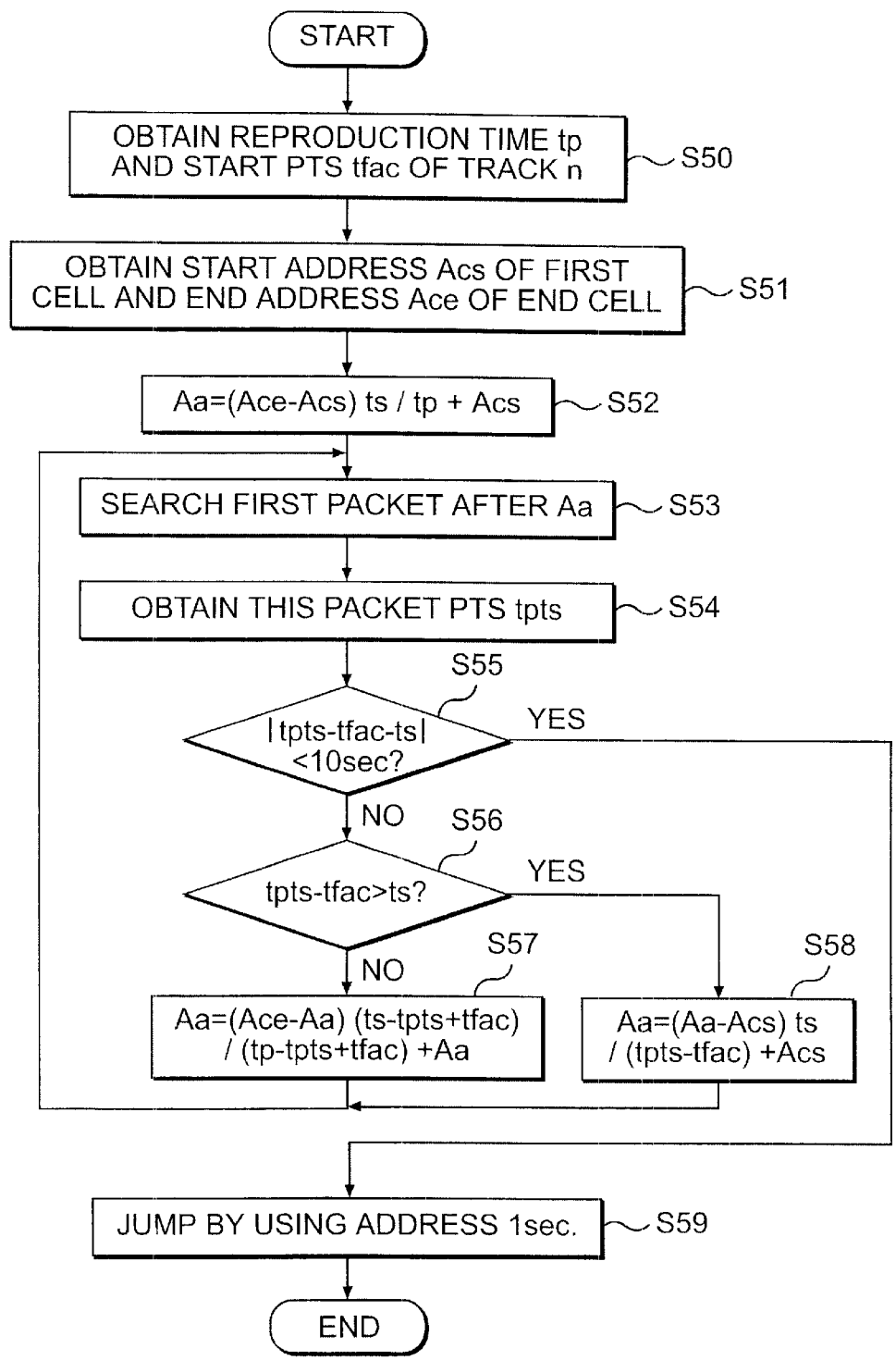
FIG. 12 is a flowchart (I) showing a process in a time search reproduction in the embodiment.

Finally, the processes of the time search reproduction are described with reference to flowcharts shown in FIGS. 12 and 13, and FIG. 14.

The time search reproduction implies the reproduction starting from any reproduction start position specified by the system controller 100, or the position corresponding to (i) a track number (e.g., a song or music composition number) specified through a remote controller or the input device 98 by an audience and (ii) an elapse period from a lead of its track (for example, a specification of being one minute after a lead of a $10^{th}$ track).

In the following time search reproduction, it is assumed to reproduce from an audio frame of a position at a search time ts in the track 260 corresponding to the $n^{th}$ single song.

In the time search reproduction of the information reproducing apparatus S, a start PTS tfac (refer to FIG. 14) that is a lead PTS of the $n^{th}$ track 260 and its entire reproduction time duration tp (refer to FIG. 14) are firstly obtained, for example, by referring to the management information within the AMG 202 and the management information within the ATSI 211 (Step S50). The actual method of obtaining the PTS and the entire reproduction time duration is known in a player for reproducing a so-called DVD video and the like. Thus, its explanation is omitted.

Here, the PTS is the time information indicative of a reproduction time on a reproduction time axis when each audio frame is outputted from the speaker. It is described for each packet header 241. Also, a lead value of each track is described in the ATSI 211.

Next, the address Acs (refer to FIG. 14) indicative of the start position of the first cell 220 within the $n^{th}$ track 260 and the address Ace (refer to FIG. 14) indicative of the end position of the end cell 220 are similarly obtained, for example, by referring to the management information within the ATSI 211 (Step S51).

Then, the expectation address Aa (refer to FIG. 14) after an elapse of the search time ts is calculated by using an equation of Aa=(Ace–Acs) ts/tp+Acs (Step S52).

Next, a first packet among packets to be reproduced after the calculated address Aa is searched (Step S53) to then detect the above-mentioned PTS in the packet as tpts (refer to FIG. 14) (Step S54).

Then, it is judged whether or not an error between the search time ts and the elapse time (tpts–tfac) within the $n^{th}$ track 260 is equal to or shorter than 10 sec. in case that the relation between the reproduction data amount and the reproduction time duration in the $n^{th}$ track 260 is assumed to be changed in a form of linear function (Step S55).

If it is judged in the judgment at the step S55 that the error between the search time ts and the elapse time (tpts–tfac) is equal to or shorter than 10 sec. (Step S55: YES), it is determined that the first packet among the packets to be reproduced after the address Aa is a packet close to the search time ts. Next, the forward search pointer 242e and the backward search pointer 242f are used to carry out the time search reproduction (Step S59). Then, the processes are ended. The operation at this step S59 will be described later in detail.

Here, the time duration of 10 sec. used as a threshold in the judgment at the step S55 is established as a time duration that the execution of the time search reproduction using the forward search pointer 242e and the backward search pointer 242f can search the search time ts faster than the time search reproduction consisting of the repetition of the operation of (i) calculating the address on an assumption that the relation between the reproduction data amount and the reproduction period in the $n^{th}$ track 259 is changed in the form of linear function, (ii) detecting its error and (iii) calculating the address again on the assumption that the relation is changed in the form of linear function.

On the other hand, if it is judged in the judgment at the step S55 that the error between the search time ts and the elapse time (tpts−tfac) is not equal to or shorter than 10 sec. (Step S55: NO), it is judged whether the elapse time (tpts−tfac) is longer or shorter than the search time ts (Step S56). If the elapse time (tpts−tfac) is longer than the search time ts (Step S56: YES), it is determined that the first packet among the packets to be reproduced after the address Aa is located behind a packet corresponding to the search time ts. Then, an equation shown in FIG. 12 (i.e., Aa=(Aa Acs)ts/(tpts−tfac)+Acs) is used to calculate a new address Aa to thereby adjust or amend a search position in a temporally forward return direction (Step S58). Again, the operational flow returns back to the step S53, and repeats the processes until that time, with the new address Aa as a start point.

Moreover, if it is judged in the judgment at the step S56 that the elapse time (tpts−tfac) is shorter than the search time ts (Step S56: NO), it is determined that the first packet among the packets to be reproduced after the address Aa is located ahead of the packet corresponding to the search time ts. Then, an equation shown in FIG. 12 (i.e., Aa=(Ace−Aa)(ts−tpts+tfac)/(tp−tpts+tfac)+Aa) is used to calculate a new address Aa to thereby adjust or amend a search position in a temporally backward return direction (Step S57). Again, the operational flow returns back to the step S53, and repeats the processes until that time, with the new address Aa as a start point.

Next, the process at the step S59 is explained below with reference to FIG. 13.

Figure 13:
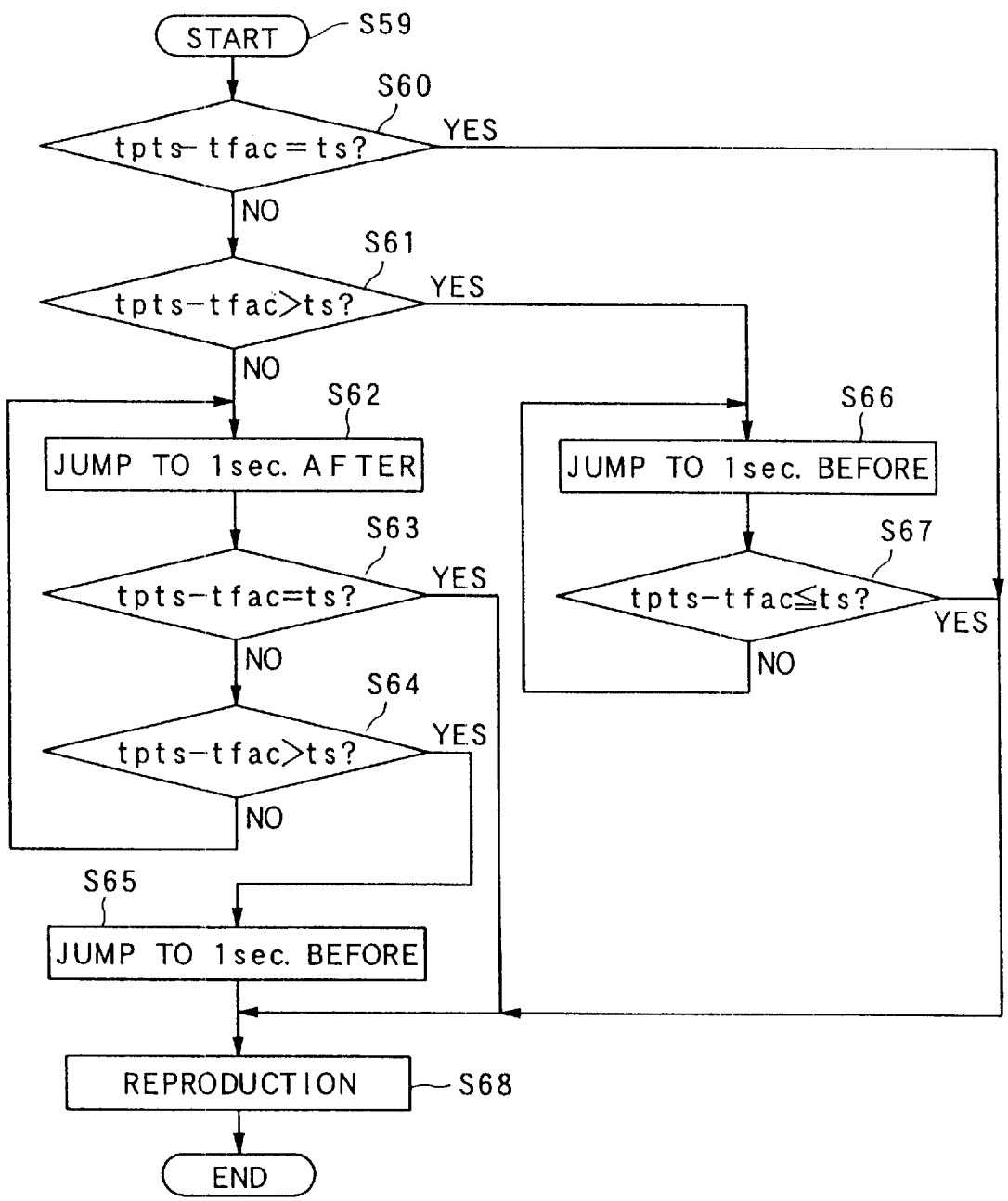
FIG. 13 is a flowchart (II) showing a process in the time search reproduction in the embodiment.

As shown in FIG. 13, in the process at the step S59, it is firstly judged whether or not the elapse time (tpts−tfac) is equal to the search time ts, i.e., whether or not the first packet among the packets to be reproduced after the address Aa agrees with the packet corresponding to the search time ts (Step S60). If it agrees, (Step S60: YES), the reproduction is carried out as it is (Step S68). Then, the time search is ended.

On the other hand, if it is judged in the judgment at the step S60 that the elapse time (tpts−tfac) is not equal to the search time ts (Step S60: NO), it is judged whether or not the elapse time (tpts−tfac) is longer than the search time ts (Step S61). If the elapse time (tpts−tfac) is longer than the search time ts (Step S61: YES), it is determined that the first packet among the packets to be reproduced after the address Aa is located behind the packet corresponding to the search time ts. Next, the backward search pointer 242f is used to jump to a lead of an audio pack including an audio frame to be reproduced 1 sec. before (Step S66). Next, as for the PTS (i.e., tpts) of a packet corresponding to the jumped audio pack, it is judged whether or not the elapse time (tpts−tfac) becomes equal to or shorter than the search time ts (Step S67). If it is equal to or shorter than the search time ts (Step S67: YES), it is determined that even if the reproduction is started as it is, the reproduction can be carried out from a timing substantially agreeing with the search time ts. Then, the operational flow proceeds to the step S68. On the other hand, if it is not equal to or shorter than the search time ts (Step S67: NO), the operational flow again returns back to the step S66, and the jump operation is carried out by using the backward search pointer 242f.

Next, if it is judged in the judgment at the step S61 that the elapse time (tpts−tfac) is not longer than the search time ts (Step S61: NO), it is determined that the first packet among the packets to be reproduced after the address Aa is located ahead of the packet corresponding to the search time ts. Next, the forward search pointer 242e is used to jump to an audio frame to be reproduced 1 sec. after (Step S62). Again, it is judged whether or not the elapse time (tpts−tfac) becomes equal to the search time ts (Step S63). If it becomes equal (Step S63: YES), the operational flow proceeds to the step S68 as it is. If it is not equal (Step S63: NO), it is again judged whether or not the elapse time (tpts−tfac) is longer than the search time ts (Step S64). If the elapse time (tpts−tfac) is longer than the search time ts (Step S64: YES), the backward search pointer 242f is used similarly to the step S66 to then jump to the audio frame to be reproduced 1 sec. before (Step S65). Then, the reproduction is started from its address position (Step S68).

If it is judged in the judgment at the step S64 that the elapse time (tpts−tfac) is not longer than the search time ts (Step S64: NO), it is determined that the first packet among the packets to be reproduced after the address Aa is located ahead of the packet corresponding to the search time ts. Then, the operational flow returns back to the step S62.

The time search reproduction using the forward search pointer 242e and the backward search pointer 242f are carried out by the above-mentioned processes.

As mentioned above, according to the DVD audio 200 and the information recording apparatus R in the embodiments, the forward search pointer 242e and the backward search pointer 242f are at least included in the private header 242 recorded together with the compressed audio data 243 within the audio pack 230. Thus, even if the information amounts of the compressed audio data 243 included in the respective audio packs 230 are different from each other because of the variable length compression, since the reproduction is controlled by using the forward search pointer 242e and the backward search pointer 242f at the time of the reproduction, it is possible to search the compressed audio data 243 to be quickly reproduced.

Also, the forward search pointer 242e and the backward search pointer 242f are recorded as the relative addresses. Thus, the forward search pointer 242e and the backward search pointer 242f can be respectively represented under the minimum information amount.

Moreover, the forward search pointer 242e and the backward search pointer 242f respectively indicate the audio pack including the audio frame to be reproduced 1 sec. after or before. Thus, at the time of the reproduction, the various reproduction controls, such as the fast forward reproduction and the like, can be effectively carried out without impairing the naturally audible feeling.

Furthermore, according to the operations of the information reproducing apparatus S in the embodiments, the fast forward reproduction, the fast backward reproduction and the time search reproduction can be effectively carried out when reproducing the audio information on which the variable length compression is performed.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No.10-334828 filed on Nov. 25, 1998 including the specification, claims, drawings and summary is incorporated herein by reference in its entirety.

What is claimed is:

1. An information recording medium on which record information comprising information units, each including partial audio information obtained by dividing compressed audio information obtained by applying a variable length compression onto raw audio information, is recorded wherein
   (i) the information unit includes header information and lead data which is the compressed audio information positioned at a lead of one or a plurality of the partial audio information, and
   (ii) the header information includes:
      reproduction time control information indicative of a time of reproducing the partial audio information, to which first lead data among the lead data included in the information unit together with the header information belongs;
      forward position information indicative of a position on said information recording medium, at which the compressed audio information to be reproduced a first predetermined time duration after a reproduction time indicated by the reproduction time control information on a reproduction time axis of the compressed audio information is recorded; and
      backward position information indicative of a position on said information recording medium, at which the compressed audio information to be reproduced a second predetermined time duration before the reproduction time on the reproduction time axis is recorded.

2. An information recording medium according to claim 1, wherein the forward position information is relative position information indicative of a position on said information recording medium of the information unit, in which the lead data to be reproduced the first predetermined time duration after is recorded, with respect to a position on said information recording medium of the information unit, in which the forward position information is recorded, and
   the backward position information is relative position information indicative of a position on said information recording medium of the information unit, in which the lead data to be reproduced the second predetermined time duration before is recorded, with respect to a position on said information recording medium of the information unit, in which the backward position information is recorded.

3. An information recording medium according to claim 1, wherein each of the first predetermined time duration and the second predetermined time duration is 1 sec. (second).

4. An information recording medium according to claim 1, wherein the record information has a physically hierarchical structure with the information unit as a bottom layer.

5. An information recording medium according to claim 4, wherein management information, which is reproduction control information with regard to whole of the compressed audio information, is recorded at a lead of the record information corresponding to a top layer of the hierarchical structure.

6. An information recording medium according to claim 5, wherein
   the compressed audio information includes one or a plurality of music composition information, and
   the management information includes:
      music composition address information to search the compressed audio information with the music composition information as a unit; and
      music composition reproduction time duration information indicative of a reproduction time duration in case of reproducing the compressed audio information with the music composition information as a unit.

7. An information recording apparatus for recording record information onto an information recording medium, the record information comprising information units, each being obtained by dividing compressed audio information obtained by applying a variable length compression onto raw audio information and each including the compressed audio information and header information, said information recording apparatus comprising:
   a reproduction control information generation device for generating reproduction control information used for reproducing the compressed audio information included in the information unit together with the header information;
   a forward position information generation device for generating forward position information indicative of a position on said information recording medium, at which the compressed audio information to be reproduced a first predetermined time duration after on a reproduction time axis of the compressed audio information is recorded;
   a backward position information generation device for generating backward position information indicative of a position on said information recording medium, at which the compressed audio information to be reproduced a second predetermined time duration before on the reproduction time axis is recorded; and
   a recording device for recording the generated reproduction control information, the generated forward position information and the generated backward position information as the header information onto said information recording medium.

8. An information recording apparatus according to claim 7, wherein each of the first predetermined time duration and the second predetermined time duration is 1 sec. (second).

9. An information reproducing apparatus for reproducing compressed audio information from an information recording medium on which record information comprising information units, each including partial audio information obtained by dividing compressed audio information obtained by applying a variable length compression onto raw audio information, is recorded,
   wherein (i) the information unit includes header information and lead data which is the compressed audio information positioned at a lead of one or a plurality of the partial audio information, and (ii) the header information includes: reproduction time control information indicative of a time of reproducing the partial audio information, to which first lead data among the lead data included in the information unit together with the header information belongs; forward position information indicative of a position on said information recording medium, at which the compressed audio information to be reproduced a first predetermined time duration after a reproduction time indicated by the reproduction time control information on a reproduction time axis of the compressed audio information is recorded; and backward position information indicative of a position on said information recording medium, at which the compressed audio information to be reproduced a second predetermined time duration before the reproduction time on the reproduction time axis is recorded, said information reproducing apparatus comprising:
  a detecting device for detecting one forward position information;
  a reproducing device for reproducing at least one portion of the compressed audio information, which is recorded on said information recording medium at a position indicated by the detected forward position information;
  a controlling device for controlling said detecting device and said reproducing device to repeat (i) detecting another forward position information recorded within the information unit, in which the reproduced compressed audio information is included, as new forward position information and (ii) reproducing at least one portion of the compressed audio information recorded on said information recording medium at a position indicated by the new forward position information.

10. An information reproducing apparatus for reproducing compressed audio information from an information recording medium on which record information comprising information units, each including partial audio information obtained by dividing compressed audio information obtained by applying a variable length compression onto raw audio information, is recorded,
  wherein (i) the information unit includes header information and lead data which is the compressed audio information positioned at a lead of one or a plurality of the partial audio information, and (ii) the header information includes: reproduction time control information indicative of a time of reproducing the partial audio information, to which first lead data among the lead data included in the information unit together with the header information belongs; forward position information indicative of a position on said information recording medium, at which the compressed audio information to be reproduced a first predetermined time duration after a reproduction time indicated by the reproduction time control information on a reproduction time axis of the compressed audio information is recorded; and backward position information indicative of a position on said information recording medium, at which the compressed audio information to be reproduced a second predetermined time duration before the reproduction time on the reproduction time axis is recorded,
  said information reproducing apparatus comprising:
    a detecting device for detecting one backward position information;
    a reproducing device for reproducing at least one portion of the compressed audio information, which is recorded on said information recording medium at a position indicated by the detected backward position information;
    a controlling device for controlling said detecting device and said reproducing device to repeat (i) detecting another backward position information recorded within the information unit, in which the reproduced compressed audio information is included, as new backward position information and (ii) reproducing at least one portion of the compressed audio information recorded on said information recording medium at a position indicated by the new backward position information.

11. An information reproducing apparatus for reproducing compressed audio information from an information recording medium on which record information comprising information units, each including partial audio information obtained by dividing compressed audio information obtained by applying a variable length compression onto raw audio information, is recorded
  wherein (i) the information unit includes header information and lead data which is the compressed audio information positioned at a lead of one or a plurality of the partial audio information, and (ii) the header information includes: reproduction time control information indicative of a time of reproducing the partial audio information, to which first lead data among the lead data included in the information unit together with the header information belongs; forward position information indicative of a position on said information recording medium, at which the compressed audio information to be reproduced a first predetermined time duration after a reproduction time indicated by the reproduction time control information on a reproduction time axis of the compressed audio information is recorded; and backward position information indicative of a position on said information recording medium, at which the compressed audio information to be reproduced a second predetermined time duration before the reproduction time on the reproduction time axis is recorded,
  wherein the record information has a physically hierarchical structure with the information unit as a bottom layer,
  wherein management information, which is reproduction control information with regard to whole of the compressed audio information, is recorded at a lead of the record information corresponding to a top layer of the hierarchical structure, and
  wherein the compressed audio information includes one or a plurality of music composition information, and the management information includes: music composition address information to search the compressed audio information with the music composition information as a unit; and music composition reproduction time duration information indicative of a reproduction time duration in case of reproducing the compressed audio information with the music composition information as a unit,
  said information reproducing apparatus comprising:
    a first detecting device for detecting the management information corresponding to the music composition information to be reproduced;
    a searching device for searching a position on said information recording medium of the music composition information to be reproduced on the basis of the detected management information;
    a second detecting device for detecting at least one of the forward position information and the backward position information within the information unit recorded at the searched position; and
    a reproducing device for searching a reproduction start position within the music composition information to be reproduced by using at least one of the detected forward position information and the detected backward position information, and reproducing the compressed audio information recorded at the searched reproduction start position.

12. An information reproducing apparatus for reproducing compressed audio information from an information recording medium on which record information comprising information units, each including partial audio information obtained by dividing compressed audio information obtained by applying a variable length compression onto raw audio information, is recorded wherein (i) the information unit includes header information and lead data which is the compressed audio information positioned at a lead of one or a plurality of the partial audio information, and (ii) the header information includes: reproduction time control information indicative of a time of reproducing the partial audio information, to which first lead data among the lead data included in the information unit together with the header information belongs; forward position information indicative of a position on said information recording medium, at which the compressed audio information to be reproduced a first predetermined time duration after a reproduction time indicated by the reproduction time control information on a reproduction time axis of the compressed audio information is recorded; and backward position information indicative of a position on said information recording medium, at which the compressed audio information to be reproduced a second predetermined time duration before the reproduction time on the reproduction time axis is recorded, wherein the record information has a physically hierarchical structure with the information unit as a bottom layer, wherein management information, which is reproduction control information with regard to whole of the compressed audio information, is recorded at a lead of the record information corresponding to a top layer of the hierarchical structure, and wherein the compressed audio information includes one or a plurality of music composition information, and the management information includes: music composition address information to search the compressed audio information with the music composition information as a unit; and music composition reproduction time duration information indicative of a reproduction time duration in case of reproducing the compressed audio information with the music composition information as a unit, said information reproducing apparatus comprising:
a designating device for designating music composition information to be reproduced and an elapse time from a lead of the music composition information;
a first detecting device for detecting the management information corresponding to the designed music composition information;
a searching device for searching a position on said information recording medium of the designated music composition information on the basis of the detected management information;
a second detecting device for detecting at least one of the forward position information and the backward position information within the information unit recorded at the searched position; and
a reproducing device for searching a reproduction start position corresponding to the designated elapsed time from the lead of the designed music composition information by using at least one of the detected forward position information and the detected backward position information, and reproducing the compressed audio information recorded at the searched reproduction start position.

13. An information recording medium on which compressed audio information obtained by applying a variable length compression onto raw audio information, is recorded comprising:
a plurality of audio packs which include a pack header and an audio packet which comprises a packet header, a private header and a plurality of access units including the compressed audio information;
wherein the audio packet includes
reproduction time control information which describes a presentation time of reproducing first data of the access unit included in the audio packet;
a forward search pointer which indicates a forward address of the record position of a forward audio pack containing lead data of a forward access unit to be reproduced a predetermined time duration period after the presentation time; and
a backward search pointer which indicates a rearward address of the record position of a rearward audio pack containing lead data of a rearward access unit to be reproduced the predetermined time duration period before the presentation time.

14. An information recording medium according to claim 13, wherein the predetermined time duration is 1 sec. (second).

15. An information recording medium according to claim 13, wherein the forward access unit is located 1200 access units ahead from the access unit and the rearward access unit is located 1200 access units rearward from the access unit.

16. An information recording medium according to claim 13, wherein the reproduction time control information is recorded in the packet header.

17. An information recording medium according to claim 13, wherein the forward search pointer and the backward search pointer are recorded in the private header.

18. An information recording apparatus for recording record information onto an information recording medium, the record information comprising compressed audio information obtained by applying a variable length compression onto raw audio information, the record information comprising a plurality of audio packs which include a pack header and an audio packet which comprises a packet header, a private header, and a plurality of access units including the compressed audio information, the information recording apparatus comprising:
a reproduction control information generation device for generating reproduction time control information which describes a presentation time of reproducing first data of the access unit included in an audio packet;
a forward search pointer generation device for generating a forward search pointer which indicates a forward address of the record position of a forward audio pack containing lead data of a forward access unit to be reproduced a predetermined time duration period after the presentation time;
a backward search pointer generation device for generating backward search pointer which indicates a rearward address of the record position of a rearward audio pack containing lead data of a rearward access unit to be reproduced the predetermined time duration period before the presentation time; and a recording device for recording the generated reproduction control information, the forward search pointer and the backward search pointer in the audio packet onto said information recording medium.

19. An information recording apparatus according to claim 18, wherein the predetermined time duration is 1 sec. (second).

20. An information recording apparatus according to claim 18, wherein the forward access unit is located 1200 access units ahead from the access unit and the rearward access is located 1200 access units rearward from the access unit.

21. An information recording apparatus according to claim 18, wherein the reproduction time control information is recorded in the packet header.

22. An information recording apparatus according to claim 18, wherein the forward search pointer and the backward search pointer are recorded in the private header.

23. An information recording method for recording record information onto an information recording medium, the record information comprising compressed audio information obtained by applying a variable length compression onto raw audio information, the record information comprising a plurality of audio packs which include a pack header and an audio packet which comprises a packet header, a private header, and a plurality of access units including the compressed audio information, the information recording method comprising:

(a) generating reproduction time control information which describes a presentation time of reproducing first data of the access unit included in an audio packet;

(b) generating a forward search pointer which indicates a forward address of the record position of a forward audio pack containing lead data of a forward access unit to be reproduced a predetermined time duration period after the presentation time;

(c) generating a backward search pointer which indicates a rearward address of the record position of a rearward audio pack containing lead data of a rearward access unit to be reproduced the predetermined time duration period before the presentation time; and (d) recording the generated reproduction time control information, the forward search pointer and the backward search pointer in the audio packet onto said information recording medium.

24. An information recording apparatus according to claim 23, wherein the predetermined time duration is 1 sec. (second).

25. An information recording apparatus according to claim 23, wherein the forward access unit is located 1200 access units ahead from the access unit and the rearward access unit is located 1200 access units rearward from the access unit.

26. An information recording method according to claim 23, wherein the reproduction time control information is recorded in the packet header.

27. An information recording method according to claim 23, wherein the forward search pointer and the backward search pointer are recorded in the private header.

28. An information reproducing apparatus for reproducing record information from an information recording medium on which compressed audio information obtained by applying a variable length compression onto raw audio information, the record information comprising a plurality of audio packs which include a pack header and an audio packet which comprises a packet header, a private header, and a plurality of access units including the compressed audio information, wherein the audio packet includes reproduction time control information which describes a presentation time of reproducing first data of the access unit included in the audio packet; a forward search pointer which indicates a forward address of the record position of a forward audio pack containing lead data of a forward access unit to be reproduced a predetermined time duration period after the presentation time; and a backward search pointer which indicates a rearward address of the record position of a rearward audio pack containing lead data of a rearward access unit to be reproduced the predetermined time duration period before the presentation time, said information reproducing apparatus comprising:

a detecting device for detecting one forward search pointer or backward search pointer;

a reproducing device for reproducing the forward or rearward access unit pointer indicated by the detected forward or backward search pointer; and a controlling device for controlling said detecting device and said reproducing device to performing a fast forward or fast backward reproduction.

29. An information reproducing apparatus according to claim 28, wherein the reproduction time control information is recorded in the packet header.

30. An information reproducing apparatus according to claim 28, wherein the forward search pointer and the backward search pointer are recorded in the private header.

31. An information reproducing method for reproducing record information from an information recording medium, the record information comprising compressed audio information obtained by applying a variable length compression onto raw audio information, the record information further comprising a plurality of audio packs which include a pack header and an audio packet which comprises a packet header, a private header, and a plurality of access units including the compressed audio information, wherein the audio packet includes reproduction time control information which describes a presentation time of reproducing first data of the access unit included in the audio packet; a forward search pointer which indicates a forward address of the record position of a forward audio pack containing lead data of a forward access unit to be reproduced a predetermined time duration period after the presentation time; and a backward search pointer which indicates a rearward address of the record position of a rearward audio pack containing lead data of a rearward access unit to be reproduced the predetermined time duration period before the presentation time, said information reproducing method comprising:

(a) detecting one forward search pointer or backward search pointer;

(b) reproducing the forward or rearward access unit pointer indicated by the detected forward or backward search pointer; and (c) controlling said detecting device and said reproducing device to perform a fast forward or fast backward reproduction.

32. An information reproducing method according to claim 31, wherein the reproduction time control information is recorded in the packet header.

33. An information reproducing method according to claims 31, wherein the forward search pointer and the backward search pointer are recorded in the private header.

* * * * *